(12) United States Patent
Hasegawa et al.

(10) Patent No.: US 7,511,102 B2
(45) Date of Patent: Mar. 31, 2009

(54) POLYMER AND LIQUID GASKET FOR IN-PLACE FORMING

(75) Inventors: Nobuhiro Hasegawa, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 32 days.

(21) Appl. No.: 11/657,548

(22) Filed: Jan. 25, 2007

(65) Prior Publication Data

US 2007/0161732 A1  Jul. 12, 2007

Related U.S. Application Data

(62) Division of application No. 10/468,146, filed as application No. PCT/JP02/01830 on Feb. 28, 2002, now Pat. No. 7,186,780.

(30) Foreign Application Priority Data

Feb. 28, 2001 (JP) ............................... 2001-55433

(51) Int. Cl.
C08F 8/00 (2006.01)

(52) U.S. Cl. .............. 525/326.6; 525/328.2; 525/328.3; 525/328.9; 525/329.2; 525/329.3; 525/329.6; 525/330.3; 525/383

(58) Field of Classification Search ............. 525/326.6, 525/328.2, 328.3, 328.9, 329.2, 329.3, 329.6, 525/330.3, 383
See application file for complete search history.

(56) References Cited

U.S. PATENT DOCUMENTS

| 5,391,610 | A | 2/1995 | Comert et al. |
| 6,194,597 | B1 | 2/2001 | Faust et al. |
| 6,414,077 | B1 * | 7/2002 | Barron et al. ............... 524/588 |

FOREIGN PATENT DOCUMENTS

| EP | 1 059 308 A1 | 2/2000 |
| EP | 1059308 | 12/2000 |
| JP | 57-076055 | 5/1982 |
| JP | 58-187481 | 11/1983 |
| JP | 59-080463 | 11/1984 |
| JP | 61-002719 | 1/1986 |
| JP | 62-011768 | 1/1987 |
| JP | 64-112 | 1/1989 |
| JP | 1-247403 | 3/1989 |
| JP | 64-14272 | 10/1990 |
| JP | 3-32593 | 5/1991 |
| JP | 3-203960 | 9/1991 |
| JP | 5-255415 | 10/1993 |
| JP | 5-262808 | 10/1993 |
| JP | 05-331342 A | 12/1993 |
| JP | 06-158024 A | 6/1994 |
| JP | 6-211922 | 8/1994 |
| JP | 6-279550 A | 10/1994 |
| JP | 9-272714 | 10/1997 |
| JP | 9-272715 | 10/1997 |
| JP | 11-005815 | 1/1999 |
| JP | 11-080249 | 3/1999 |
| JP | 11-080250 | 3/1999 |
| JP | 11-080570 | 3/1999 |
| JP | 11-080571 | 3/1999 |
| JP | 11-100433 | 4/1999 |
| JP | 11-116606 | 4/1999 |
| JP | 11-116617 | 4/1999 |
| JP | 11-116763 | 4/1999 |
| JP | 11-130931 | 5/1999 |
| JP | 2000-119350 | 4/2000 |
| JP | 2000-154370 | 6/2000 |
| JP | 2000-191912 A | 7/2000 |
| JP | 2000-344831 A | 12/2000 |
| JP | 2002-037946 A | 2/2002 |
| WO | WO 00-20468 | 4/2000 |
| WO | WO 00/20468 | 4/2000 |
| WO | WO 00-20498 | 4/2000 |
| WO | WO 00/20498 | 4/2000 |

OTHER PUBLICATIONS

Japanese Office Action dated Jun. 3, 2008, issued in corresponding counterpart Japanese Application No. 2002-567991.
Japanese Office Action dated Oct. 28, 2008, issued in corresponding Japanese Application 2002-567991.
Japanese Office Action dated Dec. 2, 2008 issued in corresponding Japanese Application No. 2002-567991.
JIS K 6258 - "Rubber, Vulcanized or Thermoplastic - Determination of the Effect of Liquids", Oct. 21, 2003, pp. 1-13.

* cited by examiner

*Primary Examiner*—Bernard Lipman
(74) *Attorney, Agent, or Firm*—Westerman, Hattori, Daniels & Adrian, LLP.

(57) ABSTRACT

A liquid sealing agent used for automobile parts, electric parts, various kinds of machine parts and the like exhibits good oil resistance, heat resistance, adhesiveness and flexibility. A vinyl polymer has at least one crosslinkable silyl group and can yield a cured product exhibiting an oil resistance superior to that of a cured product from a reference polymer obtained by replacing the repeating unit thereof with butyl acrylate alone, in any one item of the immersion test according to JIS K 6258 for the land use 3-5 lubricating oil specified in JIS K 2215.

21 Claims, No Drawings

POLYMER AND LIQUID GASKET FOR IN-PLACE FORMING

CROSS-REFERENCE TO RELATED APPLICATIONS

This application is a divisional of U.S. application Ser. No. 10/468,146 filed Jan. 13, 2004, now U.S. Pat. No. 7,186,780, which is a 371 of International Application Number PCT/JP02/01830 filed on Feb. 28, 2002.

TECHNICAL FIELD

The present invention relates to a curable composition. Particularly, the present invention relates to a liquid sealing agent used for automobile parts, electric parts, various kinds of machine parts and the like, and especially, relates to a liquid gasket for In-Place forming which comprises a vinyl polymer excellent in heat resistance and/or oil resistance and curable by moisture at room temperature. Furthermore, the present invention relates to a vinyl polymer which has at least one crosslinkable silyl group and can yield a cured product exhibiting an oil resistance superior to that of a cured product from a polymer obtained by replacing the repeating unit thereof with butyl acrylate alone, in any one item of the immersion test according to JIS K 6258 for the land use 3-5 lubricating oil specified in JIS K 2215; and a curable composition comprising the polymer.

BACKGROUND ART

Unlike polymers obtainable by ionic polymerization or polycondensation, functional group-containing vinyl polymers, in particular functional group-terminated vinyl polymers, obtainable by radical polymerization have scarcely been put to practical use. Among vinyl polymers, (meth)acrylic polymers have such characteristics as high weatherability and transparency that polyether polymers, hydrocarbon polymers or polyester polymers cannot have, and (meth)acrylic polymers having an alkenyl or crosslinking silyl group(s) on a side chain(s) are currently used in highly weather-resistant coating compositions and the like. On the other hand, it is not easy to control the polymerization of acrylic polymers because of side reactions, and it is very difficult to introduce a functional group into such polymers at one or both ends.

If vinyl polymers having an alkenyl group at a molecular chain terminus or termini can be obtained by a simple and easy method, it becomes possible to obtain cured products superior in cured product properties to cured products from vinyl polymers having a crosslinking group(s) on a side chain(s). Therefore, a number of researchers have so far made investigations concerning the method for the production thereof. However, it is not easy to produce them on a commercial scale. In Japanese Kokai Publication Hei-01-247403 and Japanese Kokai Publication Hei-05-255415, for instance, there is disclosed a method of synthesizing alkenyl-terminated (meth)acrylic polymers which uses an alkenyl group-containing disulfide as a chain transfer agent.

Japanese Kokai Publication Hei-05-262808 discloses a method of synthesizing alkenyl-terminated (meth)acrylic polymers which comprises synthesizing a vinyl polymer having a hydroxyl group at each end using a hydroxyl group-containing disulfide and further utilizing the reactivity of each hydroxyl group.

Japanese Kokai Publication Hei-06-211922 discloses a method of synthesizing silyl group-terminated (meth)acrylic polymers which comprises synthesizing a vinyl polymer having a hydroxyl group at each end using a hydroxyl group-containing polysulfide and utilizing the reactivity of each hydroxyl group.

These methods can hardly ensure that a desired functional group will be introduced at each of both ends. Hence, cured products having satisfactory characteristics cannot be obtained. For introducing a functional group at each of both ends without fail, a chain transfer agent must be used in large amounts, and this is a problem from the production process viewpoint. In addition, these methods use an ordinary method of radical polymerization, so that it is difficult to control the molecular weight and molecular weight distribution (ratio of weight average molecular weight to number average molecular weight) of the product polymer.

In view of such a state of the art, the present inventors have so far made a number of inventions relating to various crosslinkable functional group-terminated vinyl polymers, methods of producing the same, curable compositions comprising the same, and uses thereof (cf. Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714, and Japanese Kokai Publication Hei-09-272715, among others).

For example, vinyl polymers having a silicon-containing group comprising hydroxyl or hydrolyzable group(s) bound to a silicon atom and capable of crosslinking under siloxane bond formation by moisture or the like even at room temperature (hereinafter, such silicon-containing group is also referred to as "crosslinkable silyl group") or cured products obtainable from compositions comprising the same are excellent in heat resistance and weatherability and can be used in various fields of application which include, but are not limited to, sealing materials, for example sealing materials such as elastic sealing materials for building and construction and sealing materials for laminated glass, electric and electronic part materials such as solar cell back sealers, electric insulating materials such as wire/cable insulating sheath, pressure sensitive adhesive materials, adhesives, elastic adhesives, paints, powder paints, coating compositions, foamed bodies, potting materials for electric and electronic use, films, gaskets, casting materials, various molding materials, and rust-proof and waterproof sealants for end faces (cut sections) of net glass or laminated glass.

In addition, said vinyl polymer or the cured product thereof maybe used to seal an automobile part, an electric part, various kinds of machine parts and the like. Conventionally, as methods for joining and sealing an automobile parts, an electric part or various kinds of machine parts in assembling line, it has been employed a press-joining method which comprises intervening a mold gasket between sealing surfaces, or a sealing method which comprises intervening a liquid gasket between sealing surfaces. As for the sealing method which comprises intervening a liquid gasket between sealing surfaces of the parts, Formed-In-Place-Gasket (=FIPG) method, which comprises sealing the parts with automatically coating a liquid sealant on assembling line with an aid of a robot or the like, has been mainly employed in view of high productivity, low cost and reliability of sealing performance. Materials mainly used for FIPG include room temperature-curable silicone materials capable of curing by reaction with atmospheric moisture at room temperature (silicone RTV) and anaerobic gaskets based on urethane acrylate, which is capable of curing in a short time by nipping said urethane acrylate with flange surfaces in order to shut off from oxygen and to allow the gasket to contact with a metal surface. Among them, the silicone RTV is used most frequently in view of good heat resistance, good workability, good fitness against flange surfaces to be coated, or the like properties.

However, there is a problem about oil resistance in FIPG using a silicone RTV, since high performance various oils such as engine oils have been developed recently and damages of silicone rubber caused by such oils becomes serious. Up to now, various modifications have been tried to overcome the problem concerning oil resistance. As such methods, there may be mentioned a method which comprises incorporating magnesium oxide into silicone RTV (Japanese Kokai Publication Sho-57-76055), a method which comprises incorporating zinc carbonate, thiazol, thiuram and dicarbamic acid salt into silicone RTV (Japanese Kokai Publication Sho-59-80463), a method which comprises incorporating an alkali metal salt of a weak acid with acid dissociation constant of 2.0 to 12.0 into silicone RTV (Japanese Kokai Publication Sho-62-11768), a method which comprises incorporating a silane compound having one vinyl group and one hydroxyl group in one molecule (Japanese Kokai Publication Hei-1-14272), and a method which comprises incorporating iminoxysilane and a basic zinc carbonate having zinc hydroxide content of from 5 to 50% by weight, into silicone RTV (Japanese Kokai Publication Hei-3-203960). However, damages of silicone becomes serious when some oils belonging to SJ grade engine oils, which are recent high-performance engine oils, transmission oils for automatic cars, or gear oils, are used. Therefore, it becomes impossible to solve the problem by the methods described above.

On the other hand, as materials for FIPG which are excellent in oil resistance, there may be mentioned anaerobic resins whose main component is urethane (meth)acrylate resin, described in Japanese Kokai Publication Sho-58-187481, Japanese Kokai Publication Sho-64-112, Japanese Kokoku Publication Hei-3-32593 and Japanese Kokai Publication Sho-61-2719. However, said resins have a problem concerning long-term heat resistance since they have an ether bond and/or an ester bond in the main chain thereof. In addition, a cured product of the urethane (meth)acrylate is inferior in flexibility to that of a silicone resin, and thus there are some defects. Therefore, the present invention has an object to provide an oil resistant liquid gasket with maintained heat resistance, and a material for the gasket.

SUMMARY OF THE INVENTION

In view of the state mentioned above, the present inventors made intensive investigations, and as a result, found that the above problems can be solved by using certain vinyl polymers having at least one crosslinkable silyl group. Based on this findings, they have completed the present invention.

Namely, the present invention relates to a liquid gasket for In-Place forming which comprises a moisture-curable vinyl polymer. Furthermore, the present invention relates to said liquid gasket In-Place forming, wherein the moisture-curable vinyl polymer is a vinyl polymer having at least one crosslinkable silyl group;

said liquid gasket for In-Place forming, which is used to seal a part requiring oil resistance;

said liquid gasket In-Place forming, which is used to seal a part requiring oil resistance and heat resistance;

said liquid gasket In-Place forming, which is used for a site around an automobile engine; and said liquid gasket In-Place forming, which is used to seal a joint surface of an automobile oil pan.

Moreover, the present invention relates to said liquid gasket for In-Place forming which comprises a moisture curable vinyl polymer and yields a cured product exhibiting an oil resistance superior to that of a cured product from a polymer obtained by replacing the repeating unit in the main chain thereof with butyl acrylate alone, in any one item of the immersion test according to JIS K 6258 for the land use 3-5 lubricating oil specified in JIS K 2215;

said liquid gasket for In-Place forming which comprises a moisture curable vinyl polymer, and yields a cured product exhibiting an oil resistance represented by mass change between before and after immersion of at most 50% in the immersion test according to JIS K 6258 for the land use 3-5 lubricating oil specified in JIS K 2215;

said liquid gasket for In-Place forming which yields a cured product with smaller mass change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215; and said liquid gasket for In-Place forming which yields a cured product with smaller volume change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

The present invention also relates to In-Place formed gasket which is formed from the liquids gasket for In-Place forming; and a method for producing an In-Place formed gasket which comprises applying the liquid gasket for In-Place forming on a site requiring oil resistance, and then curing it.

Furthermore, the present invention relates to a vinyl polymer which has at least one crosslinkable silyl group and yields a cured product exhibiting an oil resistance superior to that of a cured product from a polymer obtained by replacing the repeating unit in the main chain thereof with butyl acrylate alone, in any one item of the immersion test according to JIS K 6258 for the land use 3-5 lubricating oil specified in JIS K 2215;

a vinyl polymer which has at least one crosslinkable silyl group and yields a cured product exhibiting an oil resistance represented by mass change between before and after immersion of at most 50% in the immersion test according to JIS K 6258 for the land use 3-5 lubricating oil specified in JIS K 2215;

said vinyl polymer, which yields a cured product with smaller mass change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215; and said vinyl polymer, which yields a cured product with smaller volume change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

The present invention relates to said vinyl polymer, a molecular terminus of the main chain of which is a crosslinkable silyl group;

said vinyl polymer, which has a molecular weight distribution of less than 1.8;

said vinyl polymer, the main chain of which is obtainable by polymerizing mainly a monomer selected from the group consisting of a (meth)acrylic monomer, an acrylonitrile monomer, an aromatic vinyl monomer, a fluorine-containing vinyl monomer and a silicon-containing vinyl monomer;

said vinyl polymer, the main chain of which is a (meth)acrylic polymer;

said vinyl polymer, the main chain of which is an acrylic polymer;

said vinyl polymer, the main chain of which is an acrylate polymer;

said vinyl polymer, the main chain of which is an ethyl acrylate polymer;

said vinyl polymer, wherein the main chain thereof is produced by a living radical polymerization;

said vinyl polymer, wherein the living radical polymerization is an atom transfer radical polymerization;

said vinyl polymer, wherein a catalyst used for the atom transfer radical polymerization is a transition metal complex containing a central metal selected from the group consisting of an element belonging to the group 7, 8, 9, 10 or 11 of the periodic table;

said vinyl polymer, wherein the metal complex used for the catalyst is a complex selected from the group consisting of copper, nickel, ruthenium or iron complex; and said vinyl polymer, wherein the metal complex is a copper complex.

Furthermore, the present invention relates to a curable composition which comprises 100 parts by weight of said vinyl polymer, and 0.1 to 20 parts by weight of a curing catalyst;

said curable composition, which comprises a curing catalyst containing tin;

a curable composition which comprises 100 parts by weight of said vinyl polymer and 0.1 to 20 parts by weight of an adhesiveness-providing agent;

said curable composition, wherein the adhesiveness-providing agent is a silane coupling agent;

a curable composition which comprises 100 parts by weight of said vinyl polymer and 5 to 150 parts by weight of a plasticizer;

said curable composition, wherein the plasticizer is a phthalic acid plasticizer; said curable composition, wherein the plasticizer is a polymer plasticizer;

a curable composition which comprises 100 parts by weight of said vinyl polymer and 5 to 1000 parts of a filler; and said curable composition, which comprises at least one member selected from the group consisting of silica, calcium carbonate and carbon black.

DETAILED DISCLOSURE OF THE INVENTION

In the following, the vinyl polymer, the curable composition containing said polymer and the liquid gasket for In-Place forming of the present invention is described in detail.

<<Re: Vinyl Polymer>>

<Main Chain>

The present inventor have so far made a number of inventions relating to various crosslinkable functional group-terminated vinyl polymers, methods of producing the same, curable compositions comprising the same and uses thereof (see Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714, Japanese Kokai Publication Hei-09-272715, and so on). The vinyl polymer to be used according to the present invention is not particularly restricted. Thus, all the polymers disclosed in the above-cited publications can appropriately be used.

The vinyl monomer constituting the main chain of the vinyl polymer according to the invention is not particularly restricted but includes various species. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; aromatic vinyl monomers such as styrene, vinyltoluene, α-methylstyrene, chlorostyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and maleic acid monoalkyl esters and dialkyl esters; fumaric acid, and fumaric acid monoalkyl esters and dialkyl esters; maleimide monomers such as maleimide, methylmaleimide, ethylmaleimide, propylmaleimide, butyl-maleimide, hexylmaleimide, octylmaleimide, dodecylmaleimide, stearylmaleimide, phenylmaleimide, and cyclohexylmaleimide; acrylonitrile monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohol, and the like. These may be used singly or a plurality of them may be subjected to copolymerization. It should be noted that the vinyl polymer according to the present invention does not include a homopolymer of butyl acrylate.

The main chain of the vinyl polymer is preferably one produced by polymerizing mainly at least one monomer selected from the group consisting of (meth)acrylic monomers, acrylonitrile monomers, aromatic vinyl monomers, fluorine-containing vinyl monomers, and silicon-containing vinyl monomers.

The term "mainly" as used herein means that a certain monomer has the greatest mole % content in a plurality of the monomer units constituting the vinyl polymer.

From the viewpoint of physical properties of products, among others, (meth)acrylic monomers are preferred. Acrylic monomers are more preferred, and acrylic ester monomers are still more preferred. Taking oil resistance or the like into consideration, ethyl acrylate monomers are particularly preferred.

A homopolymer of ethyl acrylate is somewhat inferior in characteristics at low temperature (cold resistance), although it is excellent in oil resistance and heat resistance. Therefore, it is possible to substitute a part of ethyl acrylate units into butyl acrylate units for improving the characteristics at low temperature. However, since good oil resistance derived from ethyl acrylate becomes deteriorated as a proportion of butyl acrylate increases, the proportion of butyl acrylate is preferably not more than 40%, and more preferably not more than 30%.

Furthermore, to improve low-temperature characteristics or the like without deteriorating oil resistance, it is also preferable that 2-methoxyethyl acrylate or 2-ethoxyethyl acrylate having an oxygen-introduced alkyl group in its side chain. However, when heat resistance is required, the ratio of 2-methoxyethyl acrylate, 2-ethoxyethyl acrylate or the like is preferably not more than 40%, since heat resistance tends to be poor by introduction of an alkoxy group having ether bond in a side chain. A polymer suitable for various uses or required purposes can be obtained by modifying the ratios of monomers in view of desired properties such as oil resistance, heat resistance or low-temperature characteristics. For example, as the polymer having well-balanced properties among oil resistance, heat resistance, low-temperature characteristics and the like, there may be mentioned, but is not limited to, a copolymer of ethyl acrylate/butyl acrylate/2-methoxyethyl acrylate (40 to 50/20 to 30/30 to 20, by weight ratio), among others.

In the practice of the present invention, these preferred monomers may be copolymerized or, further block-copolymerized with another monomer and, on that occasion, the content of these preferred monomers is preferably not less than 40% by weight. In the above form of expression, "(meth) acrylic acid", for instance, means acrylic acid and/or methacrylic acid.

The molecular weight distribution, namely the ratio (Mw/Mn) between the weight average molecular weight (Mw) and number average molecular weight (Mn) as determined by gel permeation chromatography, of the vinyl polymer according to the invention is not particularly restricted but preferably is less than 1.8, preferably not more than 1.7, more preferably not more than 1.6, still more preferably not more than 1.5, especially preferably not more than 1.4, most preferably not more than 1.3. In the practice of the present invention, the GPC measurement is generally carried out on a polystyrene gel column using chloroform as a mobile phase, and the number average molecular weight can be determined on the polystyrene equivalent basis.

The number average molecular weight of the vinyl polymer according to the invention is not particularly restricted but preferably is in the range from 500 to 1,000,000, more preferably 1,000 to 100,000, and still preferably 5,000 to 50,000, as determined by gel permeation chromatography.

<Method of Main Chain Synthesis>

Although the method of synthesizing the vinyl polymer according to the invention is not restricted, controlled radical polymerization is preferred, living radical polymerization is more preferred, and atom transfer radical polymerization is particularly preferred. These are explained in the following.

Controlled Radical Polymerization

Radical polymerization methods can be classified into "ordinary radical polymerization methods" which comprise merely copolymerizing a monomer having a specific functional group and a vinyl monomer(s) using an azo compound, a peroxide or the like as a polymerization initiator, and "controlled radical polymerization methods" by which a specific functional group can be introduced into a controlled site(s), for example a terminus or termini.

"Ordinary radical polymerization methods" are simple and easy to perform but allow the specific functional group-containing monomer to be introduced into the polymer only at random. For obtaining polymers with a high percentage of functionalization, it is necessary to use this monomer in fairly large amounts. When, conversely, only a small amount of the monomer is used, the problem arises that the proportion of polymer molecules formed without introduction of this specific functional group increases. Furthermore, since they are free radical polymerization, there is another problem, namely only polymers with a wide molecular weight distribution and a high viscosity can be obtained.

"Controlled radical polymerization methods" can be further classified into "chain transfer agent methods" which comprise carrying out polymerization using a chain transfer agent having a specific functional group(s) to give functional group-terminated vinyl polymers and "living radical polymerization methods" by which growing polymer termini can grow, without undergoing termination and like reactions, to give polymers with a molecular weight approximately as designed.

"Chain transfer agent methods" can give polymers with a high level of functionalization but require the use of a fairly large amount of a chain transfer agent having a specific functional group(s) relative to the initiator, hence have economical problems, inclusive of treatment-related problems. Like the above-mentioned "ordinary radical polymerization methods", there is also the problem that only polymers having a wide molecular weight distribution and a high viscosity can be obtained because of their consisting in free radical polymerization.

Unlike these polymerization methods, "living radical polymerization methods" hardly undergo termination reactions and can give polymers with a narrow molecular weight distribution (Mw/Mn being about 1.1 to 1.5) and make it possible to arbitrarily control the molecular weight by changing the monomer-to-initiator charge ratio, in spite of their belonging to the class of radical polymerization methods regarded as being difficult to control because of high rates of polymerization and a tendency toward ready occurrence of termination reactions, such as radical-to-radical coupling.

Therefore, such "living radical polymerization methods" are more preferred as the methods of producing the specific functional group-containing vinyl polymers mentioned above, since they can give polymers narrow in molecular weight distribution and low in viscosity and, in addition, make it possible to introduce specific functional group-containing monomers into the polymers at almost arbitrary positions.

The term "living polymerization", in its narrow sense, means a mode of polymerization in which molecular chains grow while their terminus or termini always retain activity. In the ordinary sense, however, the term also includes the mode of pseudo-living polymerization in which molecular chains grow while terminally inactivated ones and terminally activated ones are in equilibrium. The latter definition applies also in the present invention.

In recent years, "living radical polymerization methods" have actively been studied by a number of groups of researchers. For example, there may be mentioned the one using a cobalt porphyrin complex, as described in the Journal of the American Chemical Society (J. Am. Chem. Soc.), 1994, vol. 116, page 7943, the one using a radical capping agent, such as a nitroxide compound, as described in Macromolecules, 1994, vol. 27, page 7228, and "atom transfer radical polymerization" (ATRP) using an organic halide or the like as an initiator and a transition metal complex as a catalyst.

Methods should be used among these living polymerizations are not particularly restricted in the present invention. However, among the "living radical polymerization methods", the "atom transfer radical polymerization method", by which vinyl monomers are polymerized using an organic halide or halogenated sulfonyl compound, for instance, as an initiator and a transition metal complex as a catalyst, is more preferred for the production of specific functional group-containing vinyl polymers, for this method not only has the characteristic features of "living radical polymerization" but also gives polymers having a terminal halogen atom(s) relatively convenient for functional group conversion reactions and, further, the degree of freedom is large in initiator and catalyst designing. As examples of this atom transfer radical polymerization, there may be mentioned those described in Matyjaszewski et al.: J. Am. Chem. Soc., 1995, vol. 117, page 5614, Macromolecules, 1995, vol. 28, page 7901, Science, 1996, vol. 272, page 866, WO 96/30421, WO 97/18247, WO 98/01480, WO 98/40415 and Sawamoto et al.: Macromolecules, 1995, vol. 28, page 1721, Japanese Kokai Publication Hei-09-208616 and Japanese Kokai Publication Hei-08-41117, among others.

In the following, this living radical polymerization is described in detail. Prior thereto, one mode of controlled radical polymerization, namely polymerization using a chain transfer agent, which can be used in producing the vinyl polymer to be described later herein, is first described. The radical polymerization using a chain transfer agent (telomer) is not particularly restricted but includes, for example, the following two methods for producing vinyl polymers having a terminal structure(s) suited for utilization in the practice of the present invention.

One method is to produce halogen-terminated polymers by using a halogenated hydrocarbon as a chain transfer agent, as described in Japanese Kokai Publication Hei-04-132706, and the other is to produce hydroxyl-terminated polymers using a hydroxyl-containing mercaptan or a hydroxyl-containing polysulfide or the like as a chain transfer agent, as described in Japanese Kokai Publication Sho-61-271306, Japanese Patent No. 2594402 or Japanese Kokai Publication Sho-54-47782.

The living radical polymerization is now described.

First, the technique which uses a radical capping agent such as a nitroxide compound is described. In this polymerization, a nitroxy free radical (=N—O·), which is generally stable, is used as a radical capping agent. Such compound includes, as preferred species, but is not limited to, 2,2,6,6-tetrasubstituted-1-piperidinyloxy radicals, 2,2,5,5-tetrasubstituted-1-pyrrolidinyloxy radicals and like cyclic hydroxyamine-derived nitroxy free radicals. Suitable as the substituent are alkyl groups containing not more than 4 carbon atoms, such as methyl or ethyl. Specific nitroxy free radical compounds include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylamine-oxy radical. It is also possible to use other stable free radicals, such as galvinoxyl free radical, in lieu of nitroxy free radicals.

The above radical capping agent is used in combination with a radical former or generator. Presumably, a reaction product formed from the radical capping agent and radical generator serves as a polymerization initiator to allow the polymerization of an addition-polymerizable monomer(s) to proceed. Although the ratio between both is not particularly restricted, the radical initiator is used appropriately in an amount of 0.1 to 10 moles per mole of the radical capping agent.

While various compounds can be used as the radical generator, a peroxide capable of generating a radical under polymerization temperature conditions is preferred. Such peroxide includes, but is not limited to, diacyl peroxides such as benzoyl peroxide and lauroyl peroxide, dialkyl peroxides such as dicumyl peroxide and di-t-butyl peroxide, peroxycarbonates such as diisopropyl peroxydicarbonate and bis(4-t-butylcyclohexyl) peroxydicarbonate, and alkyl peresters such as t-butyl peroxyoctoate and t-butyl peroxybenzoate. In particular, benzoyl peroxide is preferred. Further, other radical generators, for example radical-generating azo compounds such as azobisisobutyronitrile can be used in lieu of peroxides.

Alkoxyamine compounds such as those illustrated below may be used as initiators in lieu of the combined use of a radical capping agent and a radical generator, as reported in Macromolecules, 1995, vol. 28, page 2993.

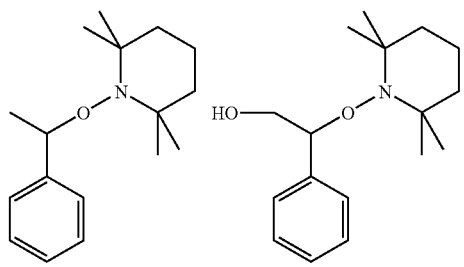

When an alkoxyamine compound is used as an initiator and that compound is one having a functional group, such as a hydroxyl group, such as the one illustrated above, functional group-terminated polymers are obtained. When this is utilized in the practice of the present invention, functional group-terminated polymers can be obtained.

The polymerization conditions, including monomer(s), solvent and polymerization temperature, to be used in the above-mentioned polymerization using a radical capping agent such as a nitroxide compound are not particularly restricted but may be the same as those used in the atom transfer radical polymerization mentioned below.

Atom Transfer Radical Polymerization

Now, the atom transfer radical polymerization method, which is more preferred as the living radical polymerization in carrying out the present invention, is described.

In this atom transfer radical polymerization, an organic halide, in particular a highly reactive carbon-halogen bond-containing organic halide (e.g. a carbonyl compound having a halogen at an α-position or a compound having a halogen at a benzyl position), a halogenated sulfonyl compound or the like is used as an initiator. Specific examples are as follows:

$C_6H_5$—$CH_2X$, $C_6H_5$—$C(H)(X)CH_3$, $C_6H_5$—$C(X)(CH_3)_2$
(in the above chemical formulas, $C_6H_5$ is a phenyl group and X is a chlorine, bromine or iodine atom);

$R^1$—$C(H)(X)$—$CO_2R^2$, $R$—$C(CH_3)(X)$—$CO_2R^2$, $R^1$—$C(H)(X)$—$C(O)R^2$, $R^1$—$C(CH_3)(X)$—$C(O)R^2$ (in the above formulas, $R^1$ and $R^2$ each is a hydrogen atom or an alkyl, aryl or aralkyl group containing 1 to 20 carbon atoms and X is a chlorine, bromine or iodine atom);

$R^1$—$C_6H_4$—$SO_2X$ (in the above formula, $R^1$ is a hydrogen atom or an alkyl, aryl or aralkyl group containing 1 to 20 carbon atoms and X is a chlorine, bromine or iodine atom); and the like.

An organic halide or halogenated sulfonyl compound having a further functional group in addition to the functional group for initiating the polymerization may also be used as the initiator in atom transfer radical polymerization. In such case, vinyl polymers having a further functional group other than the functional group for initiating the polymerization at one main chain terminus and the structure of the growing terminus in atom transfer radical polymerization at the other main chain terminus are produced. As such further functional group other than the functional group for initiating the polymerization, there may be mentioned alkenyl, crosslinkable silyl, hydroxyl, epoxy, amino and amide groups, among others.

The alkenyl group-containing organic halide is not particularly restricted but includes, among others, those having a structure represented by the general formula (1):

$$R^4R^5C(X)—R^6—R^7—C(R^3)=CH_2 \qquad (1)$$

wherein $R^3$ is a hydrogen atom or a methyl group, $R^4$ and $R^5$ each is a hydrogen atom or a univalent alkyl, aryl or aralkyl group containing 1 to 20 carbon atoms and such $R^4$ and $R^5$ groups may be bonded together at the respective other ends, $R^6$ is —C(O)O— (ester group), —C(O)— (keto group) or an o-, m- or p-phenylene group, $R^7$ is a direct bond or a bivalent organic group containing 1 to 20 carbon atoms, which may contain one or more ether bonds, and X is a chlorine, bromine or iodine atom.

As specific examples of the substituent $R^4$ and $R^5$, there may be mentioned a hydrogen atom, and methyl, ethyl, n-propyl, isopropyl, butyl, pentyl, hexyl and like groups. $R^4$ and $R^5$ may be connected to each other at the respective other ends to form a cyclic skeleton.

As specific examples of the alkenyl-containing organic halide represented by the general formula (1), there may be mentioned the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

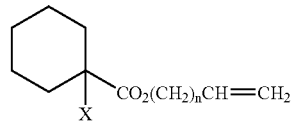

(in the above formulas, X is a chlorine, bromine or iodine atom and n is an integer of 0 to 20);

$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C X)C(O)O(CH_2)_nO(CH_2)_mCH=CH_2$, $CH_3CH_2C(H)(X)C(O)O(CH_2)_nO(CH_2)_mCH=CH_2$,

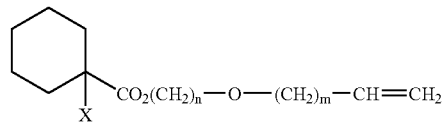

(in the above formulas, X is a chlorine, bromine or iodine atom, n is an integer of 1 to 20 and m is an integer of 0 to 20); o-, m-, p-$XCH_2$—$C_6H_4$—$(CH_2)_n$—$CH=CH_2$, o-, m-, p-$CH_3C(H)(X)$—$C_6H_4$—$(CH_2)_n$—$CH=CH_2$, o-, m-, p-$CH_3CH_2C(H)(X)$—$C_6H_4$—$(CH_2)_n$—$CH=CH_2$ (in the above formulas, X is a chlorine, bromine or iodine atom and n is an integer of 0 to 20);

o-, m-, p-$XCH_2$-$C_6H_4$—$(CH_2)_n$—O—$(CH_2)_m$—$CH=CH_2$, o-, m-, p-$CH_3C(H)(X)$—$C_6H_4$—$(CH_2)_n$—O—$(CH_2)_m$—$CH=CH_2$, o-, m-, p-$CH_3CH_2C(H)(X)$—$C_6H_4$—$(CH_2)_n$—O—$(CH_2)_m$—$CH=CH_2$ (in the above formulas, X is a chlorine, bromine or iodine atom, n is an integer of 1 to 20 and m is an integer of 0 to 20);

o-, m-, p-$XCH_2$—$C_6H_4$—O—$(CH_2)_n$—$CH=CH_2$, o-, m-, p-$CH_3C(H)(X)$—$C_6H_4$—O—$(CH_2)_n$—$CH=CH_2$, o-, m-, p-$CH_3CH_2C(H)(X)$—$C_6H_4$—O—$(CH_2)_n$—$CH=CH_2$ (in the above formulas, X is a chlorine, bromine or iodine atom and n is an integer of 0 to 20); and o-, m-, p-$XCH_2$—$C_6H_4$—O—$(CH_2)_n$—O—$(CH_2)_m$—$CH=CH_2$, o-, m-, p-$CH_3C(H)(X)$—$C_6H_4$—O—$(CH_2)_n$—O—$(CH_2)_m$—$CH=CH_2$, o-, m-, p-$CH_3CH_2C(H)(X)$—$C_6H_4$—O—$(CH_2)_n$—O—$(CH_2)_m$—$CH=CH_2$ (in the above formulas, X is a chlorine, bromine or iodine atom, n is an integer of 1 to 20 and m is an integer of 0 to 20).

As the alkenyl-containing organic halide, there may further be mentioned compounds represented by the general formula (2):

$$H_2C=C(R^3)—R^7—C(R^4)(X)—R^8—R^5 \qquad (2)$$

(wherein $R^3$, $R^4$, $R^5$, $R^7$ and X are the same as defined above and $R^8$ represents a direct bond, —C(O)O— (ester group), —C(O)— (keto group) or an o-, m- or p-phenylene group).

$R^7$ is a direct bond or a bivalent organic group (which may contain one or more ether bonds) containing 1 to 20 carbon atoms. When it is a direct bond, a vinyl group is bound to the carbon atom to which a halogen is bound, whereby an allyl halide compound is formed. In this case, the carbon-halogen bond is activated by the neighboring vinyl group, so that $R^8$ is not always required to be a C(O)O or phenylene group, for instance, but may be a direct bond. When $R^7$ is other than a direct bond, $R^8$ should preferably be a C(O)O, C(O) or phenylene group so that the carbon-halogen bond may be activated.

Specific examples of the compound of general formula (2) are as follows:

CH$_2$=CHCH$_2$X, CH$_2$=C(CH$_3$)CH$_2$X, CH$_2$=CHC(H)(X) CH$_3$, CH$_2$=C(CH$_3$)C(H)(X)CH$_3$, CH$_2$=CHC(X)(CH$_3$)$_2$, CH$_2$=CHC(H)(X)C$_2$H$_5$, CH$_2$=CHC(H)(X)CH(CH$_3$)$_2$, CH$_2$=CHC(H)(X)C$_6$H$_5$, CH$_2$=CHC(H)(X)CH$_2$C$_6$H$_5$, CH$_2$=CHCH$_2$C(H)(X)—CO$_2$R, CH$_2$=CH (CH$_2$)$_2$C(H) (X)—CO$_2$R, CH$_2$=CH(CH$_2$)$_3$C(H)(X)—CO$_2$R, CH$_2$=CH(CH$_2$)$_8$C(H)(X)—CO$_2$R, CH$_2$=CHCH$_2$C(H) (X)—C$_6$H$_5$, CH$_2$=CH(CH$_2$)$_2$C(H)(X)—C$_6$H$_5$, CH$_2$=CH(CH$_2$)$_3$C(H)(X)—C$_6$H$_5$ (in the above formulas, X is a chlorine, bromine or iodine atom and R is an alkyl, aryl or aralkyl group containing 1 to 20 carbon atoms), etc.

The following may be mentioned as specific examples of the alkenyl-containing halogenated sulfonyl compound:

o-, m-, p-CH$_2$=CH—(CH$_2$)$_n$—C$_6$H$_4$—SO$_2$X, o-, m-, p-CH$_2$=CH—(CH$_2$)$_n$—O—C$_6$H$_4$—SO$_2$X (in the above formulas, X is a chlorine, bromine or iodine atom and n is an integer of 0 to 20); etc.

The above-mentioned crosslinkable silyl-containing organic halide is not particularly restricted but includes, among others, compounds having a structure represented by the general formula (3):

$$R^4R^5C(X)—R^6—R^7—C(H)(R^3)CH_2—[Si(R^9)_{2-b}(Y)_b O]_m—Si(R^{10})_{3-a}(Y)_a \quad (3)$$

(wherein $R^3$, $R^4$, $R^5$, $R^6$, $R^7$ and X are the same as defined above, $R^9$ and $R^{10}$ each represents an alkyl, aryl or aralkyl group containing 1 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more $R^9$ or $R^{10}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19 provided that the relation a+mb$\geq$1 is satisfied).

Specific examples of the compound of general formula (3) are as follows:

XCH$_2$C(O)O(CH$_2$)$_n$Si(OCH$_3$)$_3$, CH$_3$C(H)(X)C(O)O(CH$_2$)$_n$ Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$) (OCH$_3$)$_2$, CH$_3$C(H)(X)C(O) O(CH$_2$)$_n$Si(CH$_3$)(OCH$_3$)$_2$, (CH$_3$)$_2$C(X)C(O)O(CH$_2$)$_n$Si (CH$_3$)(OCH$_3$)$_2$ (in the above formulas, X is a chlorine, bromine or iodine atom and n is an integer of 0 to 20);

XCH$_2$C(O)O(CH$_2$)$_n$O(CH$_2$)$_m$Si(OCH$_3$)$_3$, H$_3$CC(H)(X)C(O) O(CH$_2$)$_n$O(CH$_2$)$_m$Si(OCH$_3$)$_3$, (H$_3$C)$_2$C(X)C(O)O(CH$_2$)$_n$ O(CH$_2$)$_m$Si(OCH$_3$)$_3$, CH$_3$CH$_2$C(H)(X)C(O)O(CH$_2$)$_n$O (CH$_2$)$_m$Si(OCH$_3$)$_3$, XCH$_2$C(O)O(CH$_2$)$_n$O(CH$_2$)$_m$Si(CH$_3$) (OCH$_3$)$_2$, H$_3$CC(H)(X)C(O)O(CH$_2$)$_n$(CH$_2$)$_m$Si(CH$_3$) (OCH$_3$)$_2$, (H$_3$C)$_2$C(X)C(O)O(CH$_2$)$_n$(CH$_2$)$_m$Si(CH$_3$) (OCH$_3$)$_2$, CH$_3$CH$_2$C(H)(X)C(O)O(CH$_2$)$_n$(CH$_2$)$_m$Si(CH$_3$) (OCH$_3$)$_2$ (in the above formulas, X is a chlorine, bromine or iodine atom, n is an integer of 1 to 20 and m is an integer of 0 to 20);

o-, m-, p-XCH$_2$—C$_6$H$_4$—(CH$_2$)$_2$Si(OCH$_3$)$_3$, o-, m-, p-CH$_3$C (H)(X)—C$_6$H$_4$—(CH$_2$)$_2$Si(OCH$_3$)$_3$,
o-, m-, p-CH$_3$CH$_2$C(H)(X)—C$_6$H$_4$—(CH$_2$)$_2$Si(OCH$_3$)$_3$, o-, m-, p-XCH$_2$—C$_6$H$_4$—(CH$_2$)$_3$Si(OCH$_3$)$_3$, o-, m-, p-CH$_3$C (H)(X)—C$_6$H$_4$—(CH$_2$)$_3$Si(OCH$_3$)$_3$, o-, m-, p-CH$_3$CH$_2$C(H) (X)—C$_6$H$_4$—(CH$_2$)$_3$Si(OCH$_3$)$_3$, o-, m-, p-XCH$_2$—C$_6$H$_4$— (CH$_2$)$_2$—O—(CH$_2$)$_3$Si(OCH$_3$)$_3$, o-, m-, p-CH$_3$C(H)(X)— C$_6$H$_4$—(CH$_2$)$_2$—O—(CH$_2$)$_3$Si (OCH$_3$)$_3$, o-, m-, p-CH$_3$CH$_2$C(H)(X)—C$_6$H$_4$—(CH$_2$)$_2$—O—(CH$_2$)$_3$Si (OCH$_3$)$_3$, o-, m-, p-XCH$_2$—C$_6$H$_4$—O—(CH$_2$)$_3$Si(OCH$_3$)$_3$, o-, m-, p-CH$_3$C(H)(X)—C$_6$H$_4$—O—(CH$_2$)$_3$Si (OCH$_3$)$_3$, o-, m-, p-CH$_3$CH$_2$C(H)(X)—C$_6$H$_4$—O—(CH$_2$)$_3$—Si(OCH$_3$)$_3$, o-, m-, p-XCH$_2$—C$_6$H$_4$—O—(CH$_2$)$_2$—O—(CH$_2$)$_3$—Si (OCH$_3$)$_3$, o-, m-, p-CH$_3$C(H)(X)—C$_6$H$_4$—O—(CH$_2$)$_2$— O—(CH$_2$)$_3$Si(OCH$_3$)$_3$, o-, m-, p-CH$_3$CH$_2$C(H)(X)— C$_6$H$_4$—O—(CH$_2$)$_2$—O—(CH$_2$)$_3$Si(OCH$_3$)$_3$ (in the above formulas, X is a chlorine, bromine or iodine atom); etc.

As further examples of the above-mentioned crosslinkable silyl-containing organic halide, there may be mentioned compounds having a structure represented by the general formula (4):

$$(R^{10})_{3-a}(Y)_aSi—[OSi(R^9)_{2-b}(Y)_b]_m—CH_2—C(H) (R^3)—R^7—C(R^4)(X)—R^8—R^5 \quad (4)$$

wherein $R^3$, $R^4$, $R^5$, $R^7$, $R^8$, $R^9$, $R^{10}$, a, b, m, X and Y are the same as defined above.

Specific examples of such compound are as follows:

(CH$_3$O)$_3$SiCH$_2$CH$_2$C(H)(X)C$_6$H$_5$, (CH$_3$O)$_2$(CH$_3$) SiCH$_2$CH$_2$C(H)(X)C$_6$H$_5$, (CH$_3$O)$_3$Si(CH$_2$)$_2$C(H)(X)— CO$_2$R, (CH$_3$O)$_2$(CH$_3$)Si(CH$_2$)$_2$C(H)(X)—CO$_2$R, (CH$_3$O)$_3$ Si(CH$_2$)$_3$C(H)(X)—CO$_2$R, (CH$_3$O)$_2$(CH$_3$)Si (CH$_2$)$_3$C(H)(X)—CO$_2$R, (CH$_3$O)$_3$Si(CH$_2$)$_4$C(H)(X)— CO$_2$R, (CH$_3$O)$_2$(CH$_3$)Si(CH$_2$)$_4$C(H)(X)—C)$_2$R, (CH$_3$O)$_3$ Si(CH$_2$)$_9$C(H)(X)—CO$_2$R, (CH$_3$O)$_2$(CH$_3$)Si(CH$_2$)$_9$C(H) (X)—CO$_2$R, (CH$_3$O)$_3$Si(CH$_2$)$_3$C(H)(X)—C$_6$H$_5$, (CH$_3$O)$_2$ (CH$_3$)Si(CH$_2$)$_3$C(H)(X)—C$_6$H$_5$, (CH$_3$O)$_3$Si (CH$_2$)$_4$C(H)(X)—C$_6$H$_5$, (CH$_3$O)$_2$(CH$_3$)Si(CH$_2$)$_4$C(H) (X)—C$_6$H$_5$ (in the above formulas, X is a chlorine, bromine or iodine atom and R is an alkyl, aryl or aralkyl group containing 1 to 20 carbon atoms); etc.

The above-mentioned hydroxyl-containing organic halide or halogenated sulfonyl compound is not particularly restricted but includes, for example, the following:

HO—(CH$_2$)$_n$—OC(O)C(H)(R)(X)

wherein X is a chlorine, bromine or iodine atom, R is a hydrogen atom or an alkyl, aryl or aralkyl group containing 1 to 20 carbon atoms and n is an integer of 1 to 20.

The above-mentioned amino-containing organic halide or halogenated sulfonyl compound is not particularly restricted but includes, for example, the following:

H$_2$N—(CH$_2$)$_n$—OC(O)C(H)(R)(X)

wherein X is a chlorine, bromine or iodine atom, R is a hydrogen atom or an alkyl, aryl or aralkyl group containing 1 to 20 carbon atoms and n is an integer of 1 to 20.

The above-mentioned epoxy-containing organic halide or halogenated sulfonyl compound is not particularly restricted but includes, for example, the following:

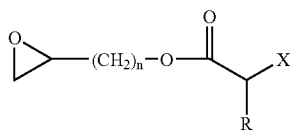

(wherein X is a chlorine, bromine or iodine atom, R is a hydrogen atom or an alkyl, aryl or aralkyl group containing 1 to 20 carbon atoms and n is an integer of 1 to 20).

For obtaining polymers having two or more growing terminal structures specified by the present invention in each molecule, an organic halide or halogenated sulfonyl compound having two or more initiation sites is preferably used as the initiator. As specific examples, there may be mentioned the following:

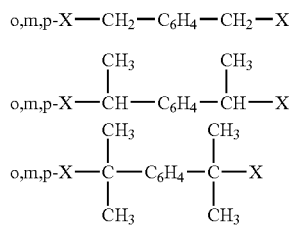

(in the above formulas, $C_6H_4$ is a phenylene group and X is a chlorine, bromine or iodine atom);

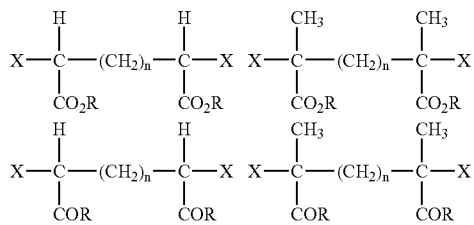

(in the above formulas, R is an alkyl, aryl or aralkyl group containing 1 to 20 carbon atoms, n is an integer of 0 to 20 and X is a chlorine, bromine or iodine atom);

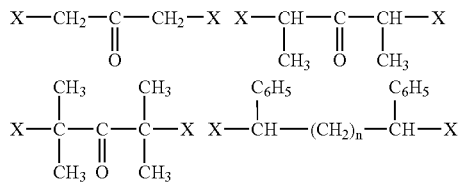

(in the above formulas, X is a chlorine, bromine or iodine atom and n is an integer of 0 to 20);

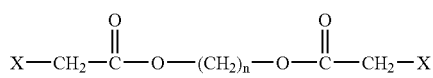

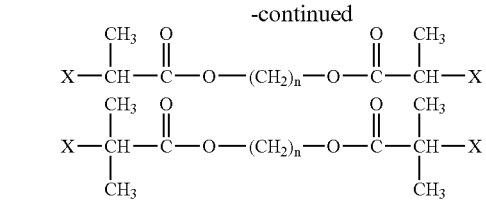

(in the above formulas, n is an integer of 1 to 20 and X is a chlorine, bromine or iodine atom);

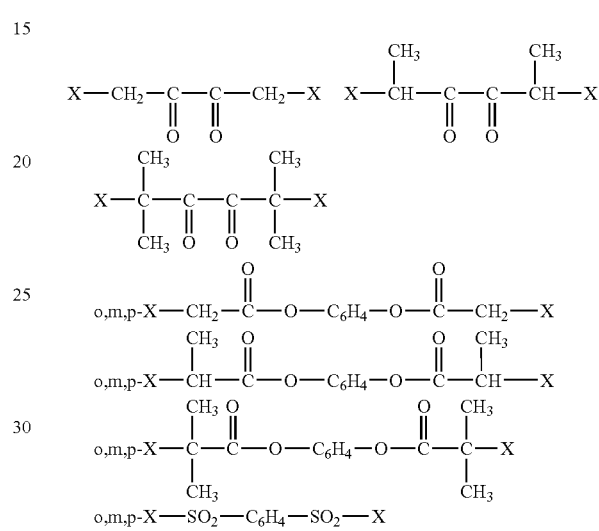

(in the above formulas, X is a chlorine, bromine or iodine atom); etc.

The vinyl monomers to be used in this polymerization are not particularly restricted but all those monomers mentioned hereinabove as examples can appropriately be used.

The transition metal complex to be used as the polymerization catalyst is not particularly restricted but preferably is a metal complex containing, as a central atom, an element belonging to the group 7, 8, 9, 10 or 11 of the periodic table. More preferred are complexes of copper, nickel, ruthenium and iron, and particularly preferred are zero-valent copper, univalent copper, bivalent nickel, bivalent ruthenium or bivalent iron. Copper complexes are preferred among others. Specific examples of the univalent copper compound are cuprous chloride, cuprous bromide, cuprous iodide, cuprous cyanide, cuprous oxide and cuprous perchlorate. When such a copper compound is used, a ligand such as 2,2'-bipyridyl or a derivative thereof, 1,10-phenanthroline or a derivative thereof or a polyamine such as tetramethylethylenediamine, pentamethyldiethylenetriamine or hexamethyltris(2-aminoethyl)amine is added for increasing the catalytic activity. Preferred ligands are nitrogen-containing compounds, more preferred ligands are chelate type nitrogen-containing compound, and still more preferred ligand is N,N,N',N'',N''-pentamethyldiethylenetriamine. The tristriphenylphosphine complex of bivalent ruthenium chloride ($RuCl_2(PPh_3)_3$) is also suited for use as the catalyst. When such a ruthenium compound is used as the catalyst, an aluminum alkoxide is added as an activator. Furthermore, the bivalent iron-bistriphenylphosphine complex ($FeCl_2(PPh_3)_2$), the bivalent nickel-bistriphenylphosphine complex (NiCl$_2$ (PPh$_3$)$_2$), and the bivalent nickel-bistributylphosphine complex (NiBr$_2$(PBu$_3$)$_2$) are also suited for use as the catalyst.

The polymerization can be carried out without using any solvent or in the presence of various solvents. As the solvent species, there may be mentioned hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, carbonate solvents such as ethylene carbonate and propylene carbonate, and the like. These may be used singly or two or more of them may be used in admixture.

The polymerization can be carried out within the temperature range of 0° C. to 200° C., preferably 50 to 150° C., although the temperature range is not limited to such range.

In the practice of the present invention, the atom transfer radical polymerization also includes the so-called reverse atom transfer radical polymerization. The reverse atom transfer radical polymerization is a method comprising reacting an ordinary atom transfer radical polymerization catalyst in its high oxidation state resulting from radical generation, for example Cu(II') when Cu(I) is used as the catalyst, with an ordinary radical initiator, such as a peroxide, to thereby bring about an equilibrium state like in atom transfer radical polymerization (cf. Macromolecules, 1999, 32, 2872).

<Functional Groups>

The vinyl polymer according to the present invention is a polymer curable by moisture. The "moisture" used in the present description means gaseous or liquid water.

As a functional group involving in a curing reaction, there may be mentioned hydroxyl group, amino group, epoxy group, an alkenyl groups, a group containing a polymerizable carbon-carbon double bond or a crosslinkable silyl group, but preferred are crosslinkable silyl groups. When the vinyl polymer contains a crosslinkable silyl group, adhesiveness of the liquid gasket for In-Place forming is usually increased. In addition, the adhesiveness may be further increased by adding an adhesiveness-providing agent or the like into the vinyl polymer having a crosslinkable silyl group.

Number of Crosslinkable Functional Groups

The number of crosslinkable functional groups of the vinyl polymer is not particularly restricted. However, in view of the composition curability and properties of the cured product thereof, the number of such groups is preferably more than 1, more preferably 1.1 to 4.0 on average, still more preferably 1.2 to 3.5.

Positions of Crosslinkable Functional Groups

Positions of crosslinkable functional groups are not particularly restricted, but when the cured products derived from the curable composition of the present invention are required to have rubber-like properties, it is essential that at least one of the crosslinkable functional groups consist in at a molecular chain terminus in order that the molecular weight between crosslinking sites, which greatly influences on the rubber elasticity, may be designed to be high. More preferably, all crosslinkable functional groups should be located at molecular chain termini.

Methods of producing such vinyl polymers, in particular (meth)acrylic polymers, having at least one crosslinkable functional group are disclosed in Japanese Kokoku Publication Hei-03-14068, Japanese Kokoku Publication Hei-04-55444 and Japanese Kokai Publication Hei-06-211922, among others. However, these methods consist in the above-mentioned free radical polymerization using a "chain transfer agent", so that the polymers obtained generally have a value of molecular weight distribution represented by Mw/Mn as high as 2 or more, hence have a problem in that their viscosity becomes high, although they have a crosslinkable functional group or groups at a molecular terminus or termini with a relatively high percentage. Therefore, for obtaining a vinyl polymer narrow in molecular weight distribution, low in viscosity and high in percentage of crosslinkable functional groups at molecular chain termini, the use of the above-mentioned "living radical polymerization method" is preferred.

In the following, an explanation is made of these functional groups.

Crosslinkable Silyl Groups

As the crosslinkable silyl groups to be used in the practice of the present invention, there may be mentioned those groups represented by the general formula (5):

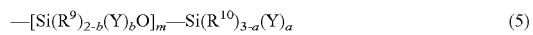

wherein, $R^9$ and $R^{10}$ each is an alkyl group containing 1 to 20 carbon atoms, an aryl group containing 6 to 20 carbon atoms, an aralkyl group containing 7 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more $R^9$ or $R^{10}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19, provided that the relation a+mb≧1 should be satisfied.

As the hydrolyzable group, there may be mentioned, among others, a hydrogen atom and those groups which are in general use, for example alkoxy, acyloxy, ketoximato, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydroxyl groups and/or hydrolyzable groups can be bound to each silicon atom and, in the practice of the present invention, it is preferred that (a+Σb) be within the range of 1 to 5. When there are two or more hydrolyzable groups or hydroxyl groups in one crosslinkable silyl group, they may be the same or different. The number of silicon atoms forming the crosslinkable silyl group is not less than 1 and, in the case of silicon atoms connected by siloxane or like bonding, it is preferably not more than 20. Particularly preferred are crosslinkable silyl groups represented by the general formula (6):

wherein $R^{10}$, Y and a are the same as defined above, because of ready availability.

In the above formula, a is not particularly restricted, but from the curability viewpoint, a is preferably at least 2.

As such a vinyl polymer having a crosslinkable silyl group, a polymer having a hydrolyzable silicon group which comprises two hydrolyzable groups bonded to one silicon atom is frequently used. However, the curing rate is insufficient in the case where particularly very rapid curing rate is required, for example, in the case that it is used for adhesives or at low temperatures or the like. Furthermore, when the product after curing is expected to have flexibility, it is necessary to decrease crosslinking density. Therefore, tackiness (surface tack) sometimes appeared because of low crosslinking density. On this occasion, a group in which a is 3 (e.g. trimethoxy functional groups) is preferable.

One in which a is 3 (e.g. trimethoxy functional groups) is more rapid in curability than one in which a is 2 (e.g. dimethoxy functional groups) but may have problems with its storage stability or mechanical properties (elongation etc.) in some instances. For attaining a balance between curability and physical properties, one in which a is 2 (e.g. dimethoxy functional groups) and one in which a is 3 (e.g. trimethoxy functional groups) may be used in combination.

<Functional Group Introduction Method>

In the following, several methods of functional group introduction into the vinyl polymer of the present invention are described, without any purpose of restriction, however.

First, methods of crosslinkable silyl, alkenyl or hydroxyl group introduction by terminal functional group conversion are described. These functional groups each can serve as a precursor of another and, therefore, mention is made in the order from crosslinkable silyl groups to respective precursors.

As methods of introducing amino group, epoxy group or a group having a polymerizable carbon-carbon double bond, there may be mentioned a method described in Japanese Kokai Publication 2001-342350.

As methods of synthesizing vinyl polymers having at least one crosslinkable silyl group, there may be mentioned, among others, the following.

(A) Method which comprises causing a crosslinkable silyl group-containing hydrosilane compound to add to a vinyl polymer having at least one alkenyl group in the presence of a hydrosilylation catalyst;

(B) Method which comprises reacting a vinyl polymer having at least one hydroxyl group with a compound having, in each molecule, a crosslinkable silyl group and a group capable of reacting with the hydroxyl group, such as an isocyanato group;

(C) Method which comprises subjecting a compound having, in each molecule, a polymerizable alkenyl group and a crosslinkable silyl group to reaction in synthesizing a vinyl polymer by radical polymerization;

(D) Method which comprises using a crosslinkable silyl group-containing chain transfer agent in synthesizing a vinyl polymer by radical polymerization; and (E) Method which comprises reacting a vinyl polymer having at least one highly reactive carbon-halogen bond with a compound having, in each molecule, a crosslinkable silyl group and a stable carbanion.

The vinyl polymer having at least one alkenyl group, which is to be used in the above method (A), can be obtained by various methods. Several methods of synthesis are mentioned below, without any purpose of restriction, however.

(A-a) Method comprising subjecting to reaction a compound having, in each molecule, a polymerizable alkenyl group together with a low polymerizability alkenyl group, such as one represented by the general formula (9) shown below, as a second monomer in synthesizing a vinyl polymer by radical polymerization:

$$H_2C=C(R^{14})-R^{15}-R^{16}-C(R^{17})=CH_2 \quad (9)$$

wherein $R^{14}$ represents a hydrogen atom or a methyl group, $R^{15}$ represents —C(O)O— or an o-, m- or p-phenylene group, $R^{16}$ represents a direct bond or a bivalent organic group containing 1 to 20 carbon atoms, which may contain one or more ether bonds, and $R^{17}$ represents a hydrogen atom, an alkyl group containing 1 to 20 carbon atoms, an aryl group containing 6 to 20 carbon atoms or an aralkyl group containing 7 to 20 carbon atoms.

The time when the compound having, in each molecule, a polymerizable alkenyl group and a low polymerizability alkenyl group is subjected to reaction is not particularly restricted but, in particular in living radical polymerization and when rubber-like properties are expected, the compound is preferably subjected to reaction as a second monomer at the final stage of the polymerization reaction or after completion of the reaction of the monomer(s) employed.

(A-b) Method comprising subjecting to reaction a compound having at least two low polymerizability alkenyl groups, for example 1,5-hexadiene, 1,7-octadiene or 1,9-decadiene, at the final stage of the polymerization or after completion of the reaction of the monomer(s) employed in vinyl polymer synthesis by living radical polymerization.

(A-c) Method comprising reacting a vinyl polymer having at least one highly reactive carbon-halogen bond with one of various alkenyl-containing organometallic compounds, for example an organotin such as allyltributyltin or allyltrioctyltin, for substitution for the halogen.

(A-d) Method comprising reacting a vinyl polymer having at least one highly reactive carbon-halogen bond with a stabilized, alkenyl-containing carbanion, such as one represented by the general formula (10), for substitution for the halogen:

$$M^+C^-(R^{18})(R^{19})-R^{20}-C(R^{17})=CH_2 \quad (10)$$

wherein $R^{17}$ is as defined above, $R^{18}$ and R19 each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a bivalent organic group containing 1 to 10 carbon atoms, which may contain one or more ether bonds, and $M^+$ represents an alkali metal ion or a quaternary ammonium ion.

Particularly preferred as the electron-withdrawing group $R^{18}$ and/or $R^{19}$ are those which have a structure of —$CO_2R$, —C(O)R or —CN.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion, such as one represented by the general formula (11) or (12), for substitution for the halogen:

$$H_2C=C(R^{17})-R^{21}-O^-M^+ \quad (11)$$

wherein $R^{17}$ and $M^+$ are the same as defined above and $R^{21}$ is a bivalent organic group containing 1 to 20 carbon atoms, which may contain one or more ether bonds;

$$H_2C=C(R^{17})-R^{22}-C(O)O^-M^+ \quad (12)$$

wherein $R^{19}$ and $M^+$ are the same as defined above and $R^{22}$ is a direct bond or a bivalent organic group containing 1 to 20 carbon atoms, which may contain one or more ether bonds.

The method of synthesizing the above-mentioned vinyl polymer having at least one highly reactive carbon-halogen bond includes, but is not limited to, atom transfer radical polymerization techniques using an organic halide or the like as initiator and a transition metal complex as catalyst, as mentioned above.

It is also possible to obtain the vinyl polymer having at least one alkenyl group from a vinyl polymer having at least one hydroxyl group. As utilizable methods, there may be mentioned, for example, the following, without any purpose of restriction.

(A-g) Method comprising reacting the hydroxyl group(s) of a vinyl polymer having at least one hydroxyl group with a base, such as sodium methoxide, followed by reaction with an alkenyl-containing halide, such as allyl chloride.

(A-h) Method comprising reacting such hydroxyl group(s) with an alkenyl-containing isocyanate compound, such as allyl isocyanate.

(A-i) Method comprising reacting such hydroxyl group(s) with an alkenyl-containing organic acid halide, such as (meth)acrylic acid chloride, in the presence of a base, such as pyridine.

(A-j) Method comprising reacting such hydroxyl group(s) with an alkenyl-containing carboxylic acid, such as acrylic acid, in the presence of an acid catalyst.

In the practice of the present invention, when no halogen is directly associated in the alkenyl group introduction, as in the method (A-a) or (A-b), the vinyl polymer is preferably synthesized by living radical polymerization. From the viewpoint of ready controllability, the method (A-b) is more preferred.

In cases where alkenyl group introduction is effected by conversion of the halogen atom(s) of a vinyl polymer having at least one highly reactive carbon-halogen atom, use is preferably made of a vinyl polymer having at least one terminal carbon-halogen bond, which is highly reactive, obtainable by subjecting a vinyl monomer(s) to radical polymerization (atom transfer radical polymerization) using, as an initiator, an organic halide or halogenated sulfonyl compound having at least one highly reactive carbon-halogen bond and, as a catalyst, a transition metal complex. In view of more ready controllability, the method (A-f) is more preferred.

The crosslinkable silyl group-containing hydrosilane compound is not particularly restricted but includes, as typical examples, compounds represented by the general formula (13):

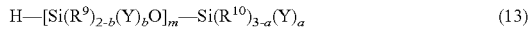  (13)

wherein $R^9$ and $R^{10}$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^9$ or $R^{10}$ groups, they may be the same or different; Y represents a hydroxyl group or a hydrolyzable group and, when there are two or more Y groups, they may be the same or different; a represents 0, 1, 2 or 3, b represents 0, 1 or 2 and m is an integer of 0 to 19, provided that the relation $a+mb \geq 1$ should be satisfied.

Particularly preferred among those hydrosilane compounds in view of ready availability are crosslinkable group-containing compounds represented by the general formula (14):

  (14)

wherein $R^{10}$, Y and a are the same as defined above.

In causing the above crosslinkable silyl-containing hydrosilane compound to add to the alkenyl group, a transition metal catalyst is generally used. The transition metal catalyst includes, among others, simple substance platinum, solid platinum dispersed in/on a carrier such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2-H_2O$, $NiCl_2$ and $TiCl_4$, for instance.

The method of producing the vinyl polymer having at least one hydroxyl group, which polymer is to be used in the methods (B) and (A-g) to (A-j), includes, but is not limited to, the following, among others.

(B-a) Method comprising subjecting to reaction, as a second monomer, a compound having both a polymerizable alkenyl group and a hydroxyl group in each molecule, for example one represented by the general formula (15) given below, in synthesizing the vinyl polymer by radical polymerization:

  (15)

wherein $R^{14}$, $R^{15}$ and $R^{16}$ are the same as defined above.

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the main monomer(s).

(B-b) Method comprising subjecting an alkenyl alcohol, such as 10-undecenol, 5-hexenol or allyl alcohol, to reaction at the final stage of polymerization reaction or after completion of the reaction of the main monomer(s) in synthesizing the vinyl polymer by living radical polymerization.

(B-c) Method comprising radical-polymerizing a vinyl monomer(s) using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer(s) to radical polymerization using hydrogen peroxide or a hydroxyl-containing initiator, as described in Japanese Kokai Publication Hei-06-239912 or Japanese Kokai Publication Hei-08-283310, for instance.

(B-e) Method comprising subjecting a vinyl monomer(s) to radical polymerization using an alcohol in excess, as described in Japanese Kokai Publication Hei-06-116312, for instance.

(B-f) Method comprising introducing a terminal hydroxyl group(s) by hydrolyzing the halogen atom(s) of a vinyl polymer having at least one-highly reactive carbon-halogen bond or reacting such halogen atom(s) with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula (16), for substitution for the halogen atom:

$$M^+C^-(R^{18})(R^{19})\text{—}R^{20}\text{—}OH \quad (16)$$

wherein $R^{18}$, $R^{19}$, $R^{20}$ and $M^+$ are the same as defined above.

Particularly preferred as the electron-withdrawing groups of $R^{18}$ and $R^{19}$ are those having a structure of —$CO_2R$, —$C(O)R$ or —CN.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula (17) or (18) given below, for substitution for the halogen atom:

$$HO\text{—}R^{21}\text{—}O^-M^+ \quad (17)$$

wherein $R^{21}$ and $M^+$ are the same as defined above;

$$HO\text{—}R^{22}\text{—}C(O)O^-M^+ \quad (18)$$

wherein $R^{22}$ and $M^+$ are the same as defined above.

(B-j) Method comprising subjecting, as a second monomer, a compound having a low polymerizability alkenyl group and a hydroxyl group in each molecule to reaction at the final stage of the polymerization reaction or after completion of the reaction of the main monomer(s) in synthesizing the vinyl polymer by living radical polymerization.

Such compound is not particularly restricted but may be a compound represented by the general formula (19), for instance:

$$H_2C\text{=}C(R^{14})\text{—}(R^{21})\text{—}OH \quad (19)$$

wherein $R^{14}$ and $R^{21}$ are the same as defined above.

The compound represented by the above general formula (19) is not particularly restricted but, in view of ready availability, alkenyl alcohols such as 10-undecenol, 5-hexenol and allyl alcohol are preferred.

In the practice of the present invention, when no halogen is directly associated in hydroxyl group introduction, as in the methods (B-a) to (B-e) and (B-j), the vinyl polymer is preferably synthesized by living radical polymerization. The method (B-b) is more preferred because of easier controllability.

In cases where hydroxyl group introduction is effected by conversion of the halogen atom(s) of a vinyl polymer having at least one highly reactive carbon-halogen bond, use is preferably made of a vinyl polymer having at least one terminal carbon-halogen bond, which is highly reactive, as obtained by subjecting a vinyl monomer(s) to radical polymerization (atom transfer radical polymerization) using an organic halide or halogenated sulfonyl compound as an initiator and, as a catalyst, a transition metal complex. From the easier controllability viewpoint, the method (B-i) is more preferred.

As the compound having a crosslinkable silyl group and a group-capable of reacting with a hydroxyl group, such as an isocyanato group, in each molecule, there may be mentioned, for example, γ-isocyanatopropyltrimethoxysilane, γ-isocyanatopropylmethyldimethoxysialne, γ-isocyanatopropyltriethoxysilane and the like. If necessary, any of urethane formation reaction catalysts generally known in the art may be used.

The compound having both a polymerizable alkenyl group and a crosslinkable silyl group in each molecule, which is to be used in the method (C), includes, among others, trimethoxysilylpropyl (meth)acrylate, methyldimethoxysilylpropyl (meth)acrylate and like compounds represented by the general formula (20):

$$H_2C\text{=}C(R^{14})\text{—}R^{15}\text{—}R^{23}\text{—}[Si(R^9)]_{2-b}(Y)_bO]_m\text{—}Si(R)_{3-a}(Y)_a \quad (20)$$

wherein $R^9$, $R^{10}$, $R^{14}$, $R^{15}$, Y, a, b and m are the same as defined above and $R^{23}$ is a direct bond or a bivalent organic group containing 1 to 20 carbon atoms, which may contain one or more ether bonds.

The time for subjecting the compound having both a polymerizable alkenyl group and a crosslinkable silyl group in each molecule is not critical but, especially in living radical polymerization, and when rubber-like properties are expected, the compound is preferably subjected to reaction as a second monomer at the final stage of the polymerization reaction or after completion of the reaction of the main monomer(s).

As the crosslinkable silyl-containing chain transfer agent to be used in the chain transfer agent method (D), there may be mentioned crosslinkable silyl-containing mercaptans and crosslinkable silyl-containing hydrosilanes, as described in Japanese Kokoku Publication Hei-03-14068 and Japanese Kokoku Publication Hei-04-55444, among others.

The method of synthesizing the vinyl polymer having at least one highly reactive carbon-halogen bond, which is to be used in the method (E), includes, but is not limited to, the atom transfer radical polymerization method which uses an organic halide or the like as an initiator and a transition metal complex as a catalyst. As the compound having both a crosslinkable silyl group and a stabilized carbanion in each molecule, there may be mentioned compounds represented by the general formula (21):

$$M^+C^-(R^{18})(R^{19})\text{—}R^{24}\text{—}C(H)(R^{25})\text{—}CH_2\text{—}[Si(R^9)_{2-b}(Y)_bO]_m\text{—}Si(R^{10})_{3-a}(Y)_a \quad (21)$$

wherein $R^9$, $R^{10}$, $R^{18}$, $R^{19}$, Y, a, b and m are the same as defined above, $R^{24}$ is a direct bond or a bivalent organic group containing 1 to 10 carbon atoms, which may contain one or more ether bonds, and $R^{25}$ represents a hydrogen atom, an alkyl group containing 1 to 10 carbon atoms, an aryl group containing 6 to 10 carbon atoms or an aralkyl group containing 7 to 10 carbon atoms.

Particularly preferred as the electron-withdrawing groups $R^{18}$ and $R^{19}$ are those having a structure of —$CO_2R$, —$C(O)R$ or —CN.

The vinyl polymer according to the present invention means preferably a vinyl polymer which has at least one crosslinkable silyl group and yields a cured product exhibiting an oil resistance superior to that of a cured product from a polymer obtained by replacing the repeating unit in the main chain thereof with butyl acrylate alone, in any one item of the immersion test according to JIS K 6258 for the land use 3-5 lubricating oil specified in JIS K 2215;

a vinyl polymer which has at least one crosslinkable silyl group and yields a cured product exhibiting an oil resistance represented by mass change between before and after immersion of at most 50% in the immersion test according to JIS K 6258 for the land use 3-5 lubricating oil specified in JIS K 2215; a vinyl polymer which yields a cured product with smaller mass change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215; or a vinyl polymer which yields a cured product with smaller volume change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

The "polymer obtained by replacing the repeating unit in the main chain thereof with butyl acrylate alone" in the present invention means a butyl acrylate homopolymer in which the functional group involved in crosslinking is essentially the same as the vinyl polymer according to the present invention, and which has the molecular weight of 0.5 to 1.5 times that of the vinyl polymer according to the present invention and the value of the molecular weight distribution of 0.5 to 1.5 times that of the vinyl polymer according to the present invention.

"The land use 3-5 lubricating oil specified in JIS K 2215" in the present invention means a lubricating oil for land engine which contains an antioxidant and a cleaning agent, and those having properties of flash point of 200° C. or more, kinematic viscosity of not less than 16.3 mm$^2$/s but less than 21.9 mm$^2$/s, viscosity index of 85 or more, pour point of −5° C. or less, and so on.

"The immersion test according to JIS K 6258" in the present invention is carried out by immersing whole the surface of cured product derived from said vinyl polymer, into the lubricating oil, and measuring changes between before and after the immersion as to mechanical properties such as size, mass, volume, surface area and elongation strength.

That "an oil resistance" is "superior" means that rate of changes such as mass change, volume change and mechanical change is smaller.

In the above immersion test, the rate of mass change between before and after the immersion is preferably not more than 50%, more preferably not more than 40%, and still more preferably not more than 30%.

The rate of volume change or mechanical change between before and after the immersion is preferably not more than 50%, more preferably not more than 40%, and still more preferably not more than 30%, respectively.

As shown above, the vinyl polymer of the present invention with the above properties is excellent, in particular, in oil resistance.

<<Curable Composition>>

In the curable composition of the present invention, a curing catalyst and/or a curing agent may be required in certain cases. Any of various compounding additives or ingredients may be added thereto according to the properties required.

<Curing Catalyst and Curing Agent>

The crosslinkable silyl group-containing polymer is crosslinked and cured under siloxane bond formation in the presence or absence of various condensing catalysts known in the art. The properties of the cured products can widely range from rubber-like to resinous ones according to the molecular weight and main chain skeleton of the polymer.

As examples of such condensing catalyst, there may be mentioned, among others, tetravalent tin compounds such as dibutyltin dilaurate, dibutyltin diacetate, dibutyltin diethylhexanolate, dibutyltin dioctoate, dibutyltin di (methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); bivalent tin compounds such as stannous octylate, stannous naphthenate and stannous stearate; monoalkyltin compounds such as monobutyltin compounds, for example, monobutyltin trisoctoate, monobutyltin triisopropoxide and the like and monooctyltin compounds; titanates such as tetrabutyl titanate and tetrapropyl titanate; organoaluminum compounds such as aluminum tris(acetylacetonate), aluminum tris(ethyl acetoacetate) and diisopropoxyaluminum ethylacetoacetate; chelate compounds such as zirconium tetraacetylacetonate and titanium tetraacetylacetoante; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; amine compound-organotin compound reaction products and mixtures, for example laurylamine-stannous octylate reaction products or mixtures; low-molecular-weight polyamide resins obtainable from a polyamine in excess and a polybasic acid; reaction products from a polyamine in excess and an epoxy compound; amino group-containing silane coupling agents such as γ-aminopropyltrimethoxysilane and N-(β-aminoethyl)aminopropylmethyldimethoxysilane; and like silanol curing catalysts and, further, other known silanol curing catalysts such as acidic catalysts and basic catalysts.

These catalysts may be used singly or two or more of them maybe used in combination. The level of addition of such curing catalyst is preferably about 0.1 to 20 parts (by weight; hereinafter the same shall apply), and more preferably 1 to 10 parts, per 100 parts of the vinyl polymer having at least one crosslinkable silyl group. When the addition level of the silanol curing catalyst is below the above range, the curing rate may fall and the curing can hardly proceed to a satisfactory extent in certain cases. Conversely, when the level of addition of the silanol condensation catalyst exceeds the above range, local heat generation and/or foaming may occur in the step of curing, making it difficult to obtain good cured products; in addition, the pot life tends to become excessively short and this is unfavorable from the work ability view point as well. Tin curing catalysts are preferably used to control curability, although it is not limited to.

For further increasing the activity of the curing catalyst in the curable composition of the present invention, a silanol group-free silicon compound represented by the general formula (37):

$$(R^{49})_a Si(OR^{50})_{4-a} \tag{37}$$

(wherein $R^{49}$ and $R^{50}$ each independently is a substituted or unsubstituted hydrocarbon group containing 1 to 20 carbon atoms and a is 0, 1, 2 or 3) may be added to the composition.

The above silicon compound is not restricted but those compounds of the general formula (37) in which $R^{49}$ is an aryl group containing 6 to 20 carbon atoms, such as phenyltrimethoxysilane, phenylmethyldimethoxysilane, phenyldimethylmethoxysilane, diphenyldimethoxysilane, diphenyldiethoxysilane and triphenylmethoxysilane, are preferred since their accelerating effect on the curing reaction of the composition is significant. In particular, diphenyldimethoxysilane and diphenyldiethoxysilane are low in cost and easily available, hence are most preferred.

The level of addition of this silicon compound is preferably about 0.01 to 20 parts, more preferably 0.1 to 10 parts, per 100 parts of the vinyl polymer having at least one crosslinkable silyl group. When the level of addition of the silicon compound is below this range, the curing reaction-accelerating effect may decrease in certain cases. When, conversely, the level of addition of the silicon compound exceeds this range, the hardness and/or tensile strength of the cured products may fall.

<Adhesiveness-Providing Agent>

In the composition of the present invention, there may be incorporated a silane coupling agent and/or an adhesiveness-providing agent other than the silane coupling agent. By adding such an adhesiveness-providing agent, it becomes possible to reduce the risk of the sealing material peeling off from adherends such as siding boards due to changes in joint width as caused by an eternal force. Furthermore, it becomes no more necessary in certain cases to use a primer for improving the adhesiveness, whereby the laying operation can be expected to be simplified.

As the silane coupling agents, there may be mentioned silane coupling agents having a functional group such as amino, mercapto, epoxy, carboxyl, vinyl or isocyanato group, isocyanurato or a halogen. As specific examples thereof, there may be mentioned isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis (2-methoxyethoxy)silane and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane and γ-acryloxyloxypropylmethyltriethoxysilane; halogen-containing silanes such as γ-chloropropyltrimethoxysilane; and isocyanurate silanes such as tris (trimethoxysilyl) isocyanurate. Also usable as the silane coupling agent are modified derivatives of these, for example amino-modified silyl polymers, silylated amino polymers, unsaturated amino silane complexes, phenylamino-long chain alkylsilanes, aminosilylated silicones, block isocyanatosilane and silylated polyesters.

As for the effect of the silane coupling agent added to the curable composition of the present invention, it produces marked adhesive property improving effects under non-primer or primer-treated conditions when the composition is applied to various adherend materials, namely inorganic materials such as glass, aluminum, stainless steel, zinc, copper and mortar, or organic materials such as polyvinyl chloride, acryls, polyesters, polyethylene, polypropylene and polycarbonates. When it is used under non-primer conditions, the improving effects on the adhesiveness to various adherends are particularly remarkable.

Specific examples of the agent other than the silane coupling agent include, but are not particularly limited to, epoxy resins, phenol resins, sulfur, alkyl titanates and aromatic polyisocyanates, among others.

The adhesiveness-providing agents specifically mentioned above may be used singly or two or more of them may be used in admixture. By adding these adhesiveness-providing agents, it is possible to improve the adhesiveness to adherends.

The addition level of the adhesiveness-providing agent is preferably 0.1 to 20 parts, and more preferably 0.5 to 10 parts, per 100 parts of the vinyl polymer. To improve the adhesiveness, especially adhesiveness against metal surfaces such as that of oil pans, 0.1 to 20 parts of silane coupling agent is preferably used, among the above adhesiveness-providing agents.

<Plasticizer>

If necessary, any of various plasticizers may be used in the curable composition of the present invention. It is advantageous to use a plasticizer in combination with a filler, which is mentioned hereinafter, since elongation of the cured product of the composition is allowed to be larger or a large quantity of fillers may be mixed, although it is not essential to add them. Such plasticizer is not particularly restricted. But, in view of the purpose of addition, for example adjustment of properties and/or modification of characteristics, recommended plasticizers are phthalate esters such as dibutyl phthalate, diheptyl phthalate, di(2-ethylhexyl) phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol esters; phosphate esters such as tricresyl phosphate and tributyl phosphate; trimellitates; polystyrenes such as polystyrene and poly-a-methylstyrene; polybutadiene, polybutene, polyisobutylene, butadiene-acrylonitrile copolymers, polychloroprene; chlorinated paraffins; hydrocarbon oils such as alkyldiphenyls and partially hydrogenated terphenyl; process oils; polyether polyols such as polyethylene glycol, polypropylene glycol and polytetramethylene glycol and derivatives of these polyether polyols as resulting from conversion of hydroxyl groups thereof to ester, ether and/or like groups; epoxy plasticizers such as epoxidized soybean oil and benzyl epoxystearate; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; and vinyl polymers obtainable by polymerizing a vinyl monomer(s) by various methods, typically acrylic plasticizers, among others. Phthalic acid-based plasticizers (phthalates) and polymer plasticizers are preferably used.

Among these, addition of a polymer plasticizer with number average molecular weight of 500 to 15000 makes it possible to control viscosity or slump of the curable composition and mechanical properties, such as tensile strength or elongation, of a cured product derived from the curable composition. Furthermore, it makes it possible to maintain initial properties for a long time and to improve dryablility (it is also referred to as "paintability") when an alkyd paint is coated onto the cured product, compared to the case of using low-molecular plasticizer which contains no polymer components. It is no matter whether this polymer plasticizer contains a functional group or not, although it is not particularly limited.

Hereinbefore, the number average molecular weight of the polymer plasticizer is described to be 500 to 15,000. However, it is preferably 800 to 10,000, and more preferably 1,000 to 8,000. When the molecular weight is too low, the plasticizer may be flowed out with the lapse of time by heat or rainfall. Therefore, it may become impossible to maintain the initial properties for a long time and to improve alkyd paintability. On the contrary, when the molecular weight is too high, viscosity may become too high and workability may become poor.

Among these polymer plasticizers, one which is compatible with vinyl polymers is preferred. Among others, in view of compatibility, weatherability and heat resistance, a polymer plasticizer based on a vinyl polymer is preferred. Furthermore, a (meth) acrylic polymer is preferred among the vinyl polymers, and an acrylic polymer is more preferred. As for synthetic methods of these acrylic polymers, there may be mentioned conventional ones obtainable by solution polymerization and solventless acrylic polymers. The latter acrylic plasticizers are more suited for the purpose of the present invention since they are produced by high-temperature continuous polymerization techniques (U.S. Pat. No. 4,414,370, Japanese Kokai Publication Sho-59-6207, Japanese Kokoku Publication Hei-05-58005, Japanese Kokai Publication Hei-01-313522, U.S. Pat. No. 5,010,166), without using any solvent or chain transfer agent. Examples thereof are not particularly restricted but include, among others, UP series products (Toagosei Co,. Ltd. )(cf. Kogyo Zairyo (Magazine for Engineering Materials), October 1999 issue). Off course, living radical polymerization may also be mentioned as another synthetic method. This method is preferred because a molecular weight distribution of the obtained polymer is narrow and it is possible to decrease the viscosity thereof. Further preferred method is atom transfer radical polymerization method, but it is not limited to this method.

The molecular weight distribution of the polymer plasticizer is not particularly restricted, but is preferably narrow one and it is preferably less than 1.8. It is more preferably not more than 1.7, still more preferably not more than 1.6, further more preferably not more than 1.5, particularly preferably not more than 1.4 and most preferably not more than 1.3.

The plasticizer containing the above polymer plasticizer may be used singly or in combination of two or more of these, but it is not always essential. Optionally, a polymer plasticizer may be used, and low-molecular-weight plasticizer may be further added combinedly provided that properties are not adversely affected.

It is also possible to incorporate these plasticizers in the process of polymer production.

The level of addition of the plasticizer, when this is used, is not particularly restricted but generally is 5 to 150 parts by weight, preferably 10 to 120 parts by weight, more preferably 20 to 100 parts by weight, per 100 parts by weight of the vinyl polymer. At levels below 5 parts by weight, the effects as the plasticizer are no more produced and, at levels above 150 parts by weight, the mechanical strength of the cured products becomes insufficient.

<Fillers>

If necessary, any of various fillers may be used in the curable composition of the present invention. The filler is not particularly restricted but includes, among others, reinforcing fillers such as wood powder, pulp, cotton chips, asbestos, glass fibers, carbon fibers, mica, walnut shell powder, rice hull powder, graphite, diatomaceous earth, terra alba, silicas (fumed silica, precipitated silica, crystalline silica, fused silica, etc.), dolomite, silicic acid anhydride, hydrous silicic acid and carbon black; fillers such as calcium carbonate (heavy calcium carbonate, colloidal calcium carbonate, etc.) magnesium carbonate, diatomaceous earth, calcined clay, clay, talc, titanium oxide, bentonite, organic bentonite, ferric oxide, red iron oxide, aluminum fine powder, flint powder, zinc oxide, activated zinc white, powdered zinc, zinc carbonate and Shirasu balloons; and fibrous fillers such as asbestos, glass fibers, glass filaments, carbon fibers, Kevlar fibers and polyethylene fibers. Preferred among these fillers are silicas such as fumed silica, precipitated silica, crystalline silica and fused silica, dolomite, carbon black, calcium carbonate, titanium oxide, talc and the like. More preferred are at least one member selected from the group consisting of silica, carbon black and calcium carbonate.

Particularly, when high strength cured products are to be obtained using these fillers, a filler selected from among fumed silica, precipitated silica, crystalline silica, fused silica, silicic acid anhydride, hydrous silicic acid, carbon black, surface-treated fine calcium carbonate, calcined clay, clay and activated zinc white, among others, may be mainly added. Among them, those advantageously used are super micro powder silicas having a specific surface area (measured by BET absorption method) in a degree of not less than 50 $m^2/g$, preferably 50 to 400 $m^2/g$, and more preferably 100 to 300 $m^2/g$. Further preferred are silicas the surface of which is subjected to hydrophobic treatment in advance with organic silicon compounds such as organosilanes, organosilazanes or diorganocyclopolysiloxanes. As more specific example of the above fillers based on silicas having high reinforcing properties, there may be mentioned, but is not limited to, Aerosil (product of Nippon Aerosil), which is one of fumed silicas, Nipsil (product of Nippon Silica Industrial), which is one of precipitated silicas.

When low-strength high-elongation cured products are desired, a filler selected from among titanium oxide, calcium carbonate, talc, ferric oxide, zinc oxide and Shirasu balloons may be mainly added. Generally, when specific surface area is small, calcium carbonate may fail to produce sufficient improving effects on the breaking strength, elongation at break, adhesiveness and weather-resistant adhesiveness of cured products. With the increasing specific surface area, its improving effects on the breaking strength, elongation at break, adhesiveness and weather-resistant adhesiveness of cured products increase.

Furthermore, those species of calcium carbonate which have been surface-treated with a surface-finishing agent are more preferred. When surface-treated calcium carbonate is used, the workability of the curable composition of the present invention and the improving effects on the adhesiveness and weather-resistant adhesiveness of the curable composition are expected to be improved as compared with the use of non-surface-treated calcium carbonate. Usable as the above surface-treating agent are organic materials or various surfactants, such as fatty acids, fatty acid soaps and fatty acid esters, and various coupling agents, such as silane coupling agents and titanate coupling agents. Specific examples include, but are not limited to, fatty acids such as caproic acid, caprylic acid, pelargonic acid, capric acid, undecanoic acid, lauric acid, myristic acid, palmitic acid, stearic acid, behenic acid and oleic acid, the sodium, potassium or like salts of such fatty acids, and alkyl esters of such fatty acids. Typical examples of the surfactants are sulfate ester type anionic surfactants such as polyoxyethylene alkyl ether sulfate esters and long-chain alcohol sulfates and the sodium, potassium or like salts thereof, and sulfonic acid type anionic surfactants such as alkylbenzenesulfonic acids, alkylnapthalenesulfonic acids, paraffinsulfonic acids, a-olefinsulfonic acids, alkylsulfosuccinic acids and the like and the sodium, potassium or like salts thereof. This surface-finishing agent is used in the treatment preferably in an amount within the range of 0.1 to 20% by weight, more preferably within the range of 1 to 5% by weight, relative to calcium carbonate. When the amount used for the treatment is less than 0.1% by weight, the workability, adhesiveness and weather-resistant adhesiveness may not be improved to a sufficient extent. When it exceeds 20% by weight, the storage stability of the curable composition may decrease.

Although it is not particularly limited, colloidal calcium carbonate is preferably used among calcium carbonates when improving effects on thixotropy of blended mixture or tensile strength at break, elongation at break, adhesiveness, weather-resistant adhesiveness and the like, are particularly expected.

On the other hand, heavy calcium carbonate is sometimes added in order to decrease viscosity, increase quantity, lower cost and the like. When this heavy calcium carbonate is used, those described below may be optionally used.

The heavy calcium carbonate is a product obtained by mechanically crushing and processing natural chalk, marble, limestone or the like. The crushing method includes dry process and wet-process, but the product obtained by wet-process is not preferably in many cases, because it is often deteriorate storage stability of the curable composition of the present invention. Heavy calcium carbonates are classified into products with various average particle sizes. Although it is not particularly limited, when improving effects on tensile strength at break, elongation at break, adhesiveness, weather-resistant adhesiveness or the like, are expected, it is preferably used one having a specific surface area of 1.5 to 50 m$^2$/g, more preferably 2 to 50 m$^2$/g, still more preferably 2.4 to 50 m$^2$/g, and particularly preferably 3 to 50 m$^2$/g. When the specific surface area is less than 1.5 m$^2$/g, the improving effect may be insufficient in some cases. Off course, the above ranges are not necessarily applied to the case to simply decrease a viscosity or only to increase quantity.

The "specific surface area" means a value measured by air-permeation method according to JIS K 5101 (namely, the method to determine the specific surface area from permeability of air into a powder-packed layer). As a measurement apparatus, surface area analyzer SS-100 (product of Shimadzu) is preferably used.

These fillers may be used singly or in combinations of two or more of these, according to the purposes or requirement. Although it is not particularly restricted, by using a combination of a heavy calcium carbonate having a specific surface area of not less than 1.5 m$^2$/g and colloidal calcium carbonate, viscosity increase of blended mixture is controlled within the acceptable level, and improving effects on tensile strength at break, elongation at break, adhesiveness, weather-resistance adhesiveness or the like, are highly expected.

When a filler is used, the level of addition thereof is preferably within the range of 5 to 1,000 parts by weight, more preferably within the range of 20 to 500 parts by weight, most preferably within the range of 40 to 300 parts by weight, per 100 parts by weight of vinyl polymer. When the addition level is below 5 parts by weight, the improving effects on tensile strength at break, elongation at break, adhesiveness, weather-resistant adhesiveness may be insufficient and, when it exceeds 1,000 parts by weight, the workability of the curable composition may decrease in certain cases. A single filler may be used alone or two or more fillers may be used in combination.

<Hollow Microparticle>

Additionally, hollow microparticles may be used in combination with the above polymer, in order to reduce weight and cost without significant deterioration of properties.

As such hollow microparticles (hereinafter, referred to as a "balloons"), there may be mentioned, but is not limited to, hollow bodies composed of inorganic or organic materials with the diameter of not more than 1 mm, preferably not more than 500 μm, and more preferably not more than 200 μm, in accordance with the description in "Kinosei filler no Saishin Gijutsu" ("Latest technologies of fillers", published by CMC). Especially, a hollow microbody with true specific gravity of 1.0 g/cm$^3$ is preferably used, and a hollow microbody with true specific gravity of 0.5 g/cm$^3$ is still more preferably used.

As the inorganic balloons, there may be mentioned silicic acid-based balloons and the other balloons than silicic acid-based balloons. As the silicic acid-based balloons, there may be mentioned, among others, Shirasu balloons, pearlites, glass balloons, silica balloons and fly ash balloons. As the other balloons than silicic acid-based balloons, there may be mentioned, among others, alumina balloons, zirconia balloons and carbon balloons. As specific examples of these inorganic balloons, commercially available balloons which may be mentioned are WINLITE (produced by Ijichi chemical) and SANKILITE (produced by Sanki), as the Shirasu-balloons; CELLSTAR Z-28 (produced by Sumitomo 3M), MICRO BALLOON (produced by EMERSON & CUMING), CELAMIC GLASSMODULES (produced by PITTSBURGE CORNING) and GLASS BUBBLES (produced by 3M), as the glass balloons; Q-CEL (produced by Asahi Glass) and E-SPHERES (produced by Taiheiyo-Cement), as the silica balloons; CEROSPHERES (produced by PFA MARKETING) and FILLITE (produced by FILLITE U.S.A), as fly ash balloons; BW (produced by Showa Denko), as the alumina balloon; HOLLOW ZIRCONIUM SPHEES (produced by ZIRCOA), as the zirconia balloon; and Kreca Sphere (produced by KUREHA Chemical) and CARBOSPHERE (produced by GENERAL TECHNOLOGIES),as the carbon balloons.

As the above organic balloons, there may be mentioned thermosetting resin-based balloons and thermoplastic resin-based balloons. As the thermosetting resins, there may be mentioned phenol balloons, epoxy balloons and urea balloons. As the thermoplastic balloons, there may be mentioned Saran balloons, polystyrene balloons, polymethacrylate balloons, polyvinyl alcohol balloons and styrene-acrylic balloons. Furthermore, a balloon of a crosslinked thermoplastic resin may be also used. The "balloon" as described above may be a foamed balloon, and may be a balloon obtainable by foaming a mixture in which a foaming agent is blended.

Among these organic balloons, commercially available ones which may be mentioned are UCAR and PHENOLIC MICROBALLOONS (both are produced by Union Carbide), as the phenol balloons; ECCOSPHERES (produced by EMERSON & CUMING), as the epoxy balloon; ECCOSPHERES VF-O (produced by EMERSON & CUMING), as the urea balloon; SARAN MICROSPHERES (produced by DOW CHEMICAL), EXPANCEL (produced by Akzo Nobel), MATSUMOTO MICROSPHERE (produced by Matsumoto-Yushi Seiyaku), as the Saran balloons; DYLITE EXPANDABLE POLYSTYRENE (produced by ARCO POLYMERS), EXPANDABLE POLYSTYRENE BEADS (produced by BASF WYANDOTE), as the polystyrene balloons; and SX 863 (P)(produced by Japan Synthetic Rubber), as crosslinked styrene-acrylic balloon.

The above balloons may be used singly or as a mixture of two or more of them. Furthermore, products may be used, whose surface is treated, in order to improve dispersibility and workability of blended mixture, with an aliphatic acid, an aliphatic acid ester, rosin, rosinic acid lignin, a silane coupling agent, a titan coupling agent, an aluminum coupling agent, polypropylene glycol or the like. These balloons are used to lower weight and to reduce cost, among properties of cured product of the blended mixture, without deteriorating flexibility, elongation and strength.

The content of the balloon to be incorporated is, but is not limited to, preferably in the range of 0.1 to 50 parts, more preferably in the range of 0.1 to 30 parts, per 100 parts by weight of vinyl polymer. When the content is below 0.1 parts by weight, the weight-lowering effect may be poor and, when it exceeds 50 parts by weight, tensile strength, among mechanical properties of cured product of the blended mixture, may be deteriorated in certain cases. In the case where the specific gravity is not less than 0.1, it is preferably 3 to 50 parts, and more preferably 5 to 30 parts.

<Property-Adjusting Agent>

One or more property-adjusting agents may be added to the curable composition of the present invention according to need for adjusting the tensile characteristics of the resulting cured products.

The property-adjusting agent is not particularly restricted but includes, among others, alkylalkoxysilanes such as methyltrimethoxysilane, dimethyldimethoxysilane, trimethylmethoxysilane and n-propyltrimethoxysilane; alkylisoprope-noxysilanes such as dimethyldiisopropenoxysilane, methyltriisopropenoxysilane and γ-glycidoxypropylmethyldiisopropenoxysilane, functional group-containing alkoxysilanes, such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. By using such property adjusting-agent(s), it becomes possible to increase the hardness at the time of curing of the composition of the present invention or decrease them to attain elongation properties. The property-adjusting agent such as mentioned above may be used singly or two or more of them may be used in combination.

<Silanol-Containing Compound>

A silanol-containing compound may optionally be added into the curable composition of the present invention, according to the requirement to modify a property of the cured product or the like. The "silanol-containing compound" means a compound having one silanol group in a molecule and/or a compound capable of forming a compound having one silanol group in a molecule by a reaction with moisture. When these compounds are used, only one of the above two compounds may be used, or both of them may be used simultaneously.

The compounds having one silanol group in a molecule, which is one kind of silanol-containing compounds, is not particularly restricted. Among others, there may be mentioned compounds which can be represented by the formula (R'')$_3$SiOH (wherein R''s are the same or different kind of substituted or non-substituted alkyl or aryl group), for example, the following compounds:

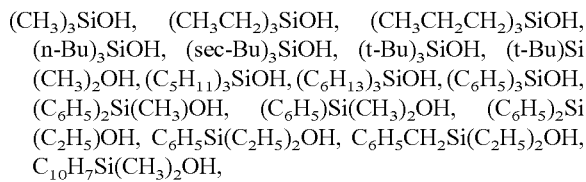

(wherein $C_6H_5$ represents phenyl group and $C_{10}H_7$ represents a naphthyl group;

silanol group-containing cyclic polysiloxanes compounds, for example, the following compounds;

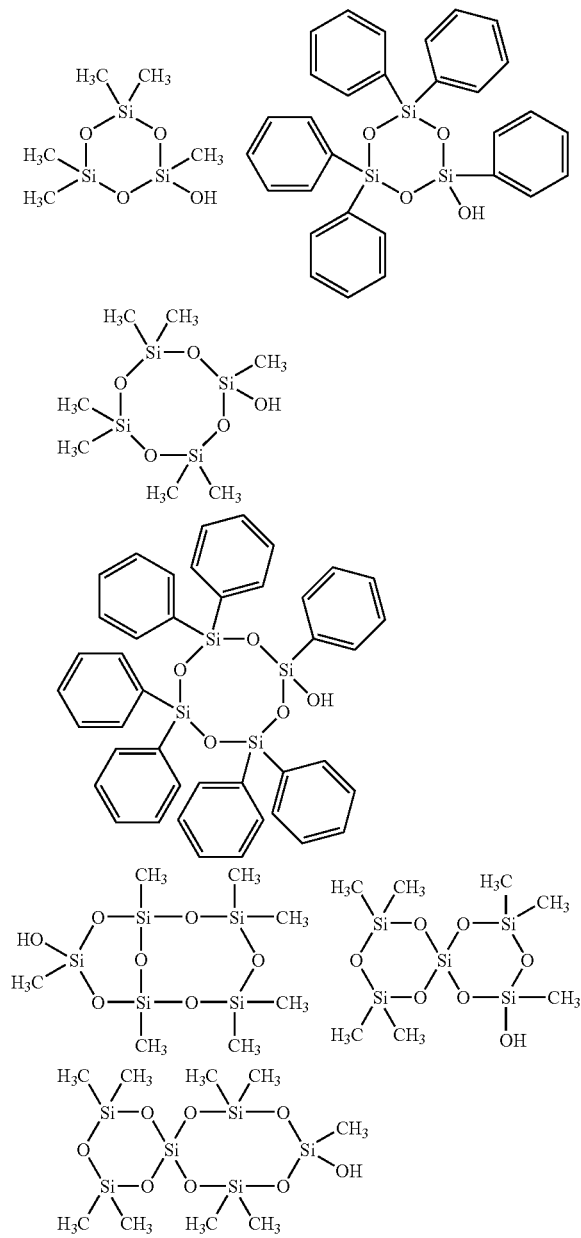

silanol group-containing chain polysiloxanes compounds, for example, the following compounds:

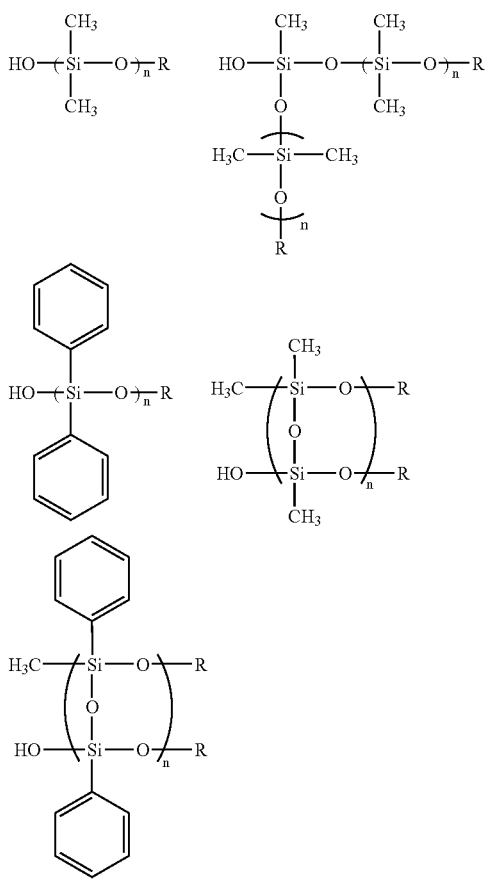

compounds the polymer main chain of which is composed of silicon and carbon atoms and in which a silanol group is bonded at the molecular terminus, for example, the following compounds:

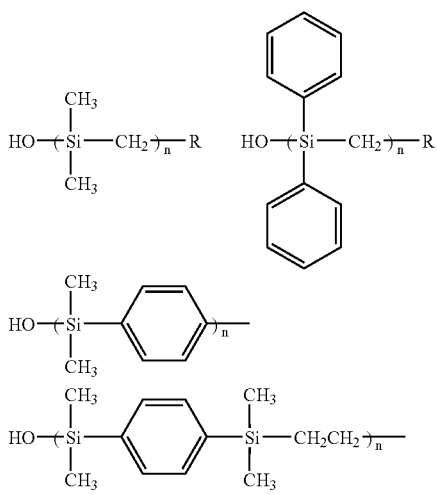

compounds in which silanol group is bonded to the main chain of polysilane at a molecular terminus, for example, the following compounds:

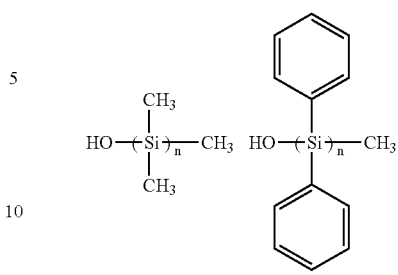

and compounds the polymer main chain of which is composed of silicon, carbon and oxygen atoms and in which a silanol group is bonded at the molecular terminus, for example, the following compounds:

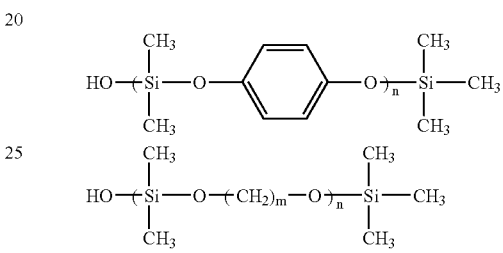

and the like. Among them, the compounds represented by the following formula (45) are preferred.

$$(R^{58})_3SiOH \qquad (45)$$

(wherein $R^{58}$ represents a univalent hydrocarbon group containing 1 to 20 carbon atoms, and a plurality of $R^{58}$ may be the same or different).

$R^{58}$ is preferably methyl, ethyl, vinyl, t-butyl or phenyl group, and more preferably methyl group.

Among them, the low-molecular compounds, such as $(CH_3)_3SiOH$ is preferred in view of ready availability and effects.

It is presumed that flexibility of a cured product is given by a reaction of a compound having silanol group in one molecule with a crosslinkable silyl group of a vinyl polymer or a siloxane bond formed by crosslinking, to thereby reduce crosslinking points.

The compounds capable of forming a compound having one silanol group in a molecule by a reaction with moisture are not particularly restricted, but are preferably compounds in which the compound having one silanol group in a molecule formed by a reaction with moisture is represented by the general formula (45). For example, the following compounds may be mentioned in addition to the compounds represented by the general formula (46), as described below. Such compounds which may be suitably used are N,O-bis(trimethylsilyl)acetamide, N-(trimethylsilyl)acetamide, bis(trimethylsilyl)trifluoroacetamide, N-methyl-N-trimethylsilyltrifluoroacetarflide, bis(trimethylsilyl)urea, N-t-butyldimethylsilyl) N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethanesulfOnate, trimethylsilylphenoxide, trimethylsilylated product of n-octanol, trimethylsilylated product of 2ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, $(C_3)_3SiNHSi(CH_3)_3$, $(CH_3)_3SiNSi(CH_3)_2$, and the following compounds:

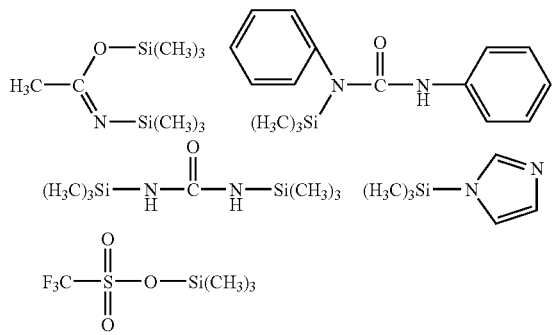

Among them, $(CH_3)_3SiNHSi(CH_3)_3$ is particularly preferred in view of an amount of contained silanol group in a hydrolysis product.

Furthermore, compounds capable of forming a compound having one silanol group in a molecule by a reaction with moisture are not particularly restricted, but the compounds represented by the following general formula (46) are preferred in addition to the above compounds:

$((R^{58})_3SiO)_nR^{59}$  (46)

wherein $R^{58}$ is as defined above; n represents a positive number; and $R^{59}$ represents a group exclusive of a part of or all of the active hydrogen from an active hydrogen-containing compound. $R^{58}$ is preferably methyl, ethyl, vinyl, t-butyl, or phenyl group, and more preferably methyl group.

$(R^{58})_3SiO$ group is preferably trimethylsilyl group in which all three $R^{58}$s are methyl group, and n is preferably 1 to 5.

Active hydrogen-containing compounds, which are origins of the above $R^{59}$, are not particularly restricted, but includes, among others, alcohols such as methanol, ethanol, n-butanol, i-butanol, t-butanol, n-octanol, 2-ethylhexanol, benzyl alcohol, ethylene glycol, diethylene glycol, polyethylene glycol, propylene glycol, dipropylene glycol, polypropylene glycol, propanediol, tetramethylene glycol, polytetramethylene glycol, glycerin, trimethylolpropane and pentaerythritol; phenols such as phenol, cresol, bisphenol A and hydroquinone; carboxylic acids such as formic acid, acetic acid, propionic acid, lauric acid, palmitic acid, stearic acid, behenic acid, acrylic acid, methacrylic acid, oleic acid, linolic acid, linolenic acid, sorbic acid, oxalic acid, malonic acid, succinic acid, adipic acid, maleic acid, benzoic acid, phthalic acid, terephthalic acid and trimellitic acid; ammonia; amines such as methylamine, dimethylamine, ethylamine, diethylamine, n-butylamine and imidazole; ureas such as urea and N,N'-diphenylurea; and ketones such as acetone, acetylketone and 2,4-heptadione.

Although it is not particularly limited, a compound capable of forming a compound having one silanol group in a molecule by a reaction with moisture, represented by the above general formula (46), is obtainable by, for example, subjecting the above-mentioned active hydrogen-containing compound or the like to the reaction with the compound having a group capable of reacting with the active hydrogen, such as a halogen group, together with a $(R^{58})_3Si$ group, which is sometimes referred to as "silylating agent", such as trimethylsilyl chloride or dimethyl(t-butyl) silyl chloride. In the above description, $R^{58}$ is the same one as defined above.

The compounds represented by the general formula (46) includes allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3,-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, and the like. These may be used singly or in combination of two or more.

Additionally, the compounds which may be represented by the general formula $((R^{60})_3SiO)(R^{61}O)_s)_t)$, $CH_3O(CH_2CH(CH_3)O)_5Si(CH_3)_3$, $CH_2$=$CHCH_2(CH_2CH\ (CH_3)O)_5Si(CH_3)_3$, $(CH_3)_3SiO(CH_2CH(CH_3)O)_5Si(CH_3)_3$, and $(CH_3)_3SiO (CH_2CH (CH_3)O)_7Si(CH_3)_3$ (wherein $R^{60}$ represents the same or different kind of substituted or unsubstituted univalent hydrocarbon group; $R^{61}$ is an bivalent hydrocarbon group containing 1 to 8 carbon atoms; s and t are positive numbers, s is 1 to 6 and s times t is not less than 5; and Z is an mono- to hexa-valent organic group), are also suitably used. These may be used singly or in combination of two or more.

Among the compounds capable of forming a compound having one silanol group in a molecule by a reaction with moisture, the active hydrogen compounds which is formed after hydrolysis are preferably phenols, acid amides and alcohols since there are no adverse affects on storage stability, weatherability or the like. More preferred are phenols and alcohols, in which the active hydrogen compound is hydroxyl group.

Among the above compounds, preferred are N,O-bis(trimethylsilyl)acetamide, N-(trimethylsilyl)acetamide, trimethylsilylphenoxide, trimethylsilylated product of n-octanol, trimethylsilylated product of 2-ethylhexanol, tris (trimethylsilyl)ated product of trimethylolpropane, tris (trimethylsilyl)ated product of pentaerythritol, tetra (trimethylsilyl)ated product of pentaerythritol, and the like.

The compounds capable of forming a compound having one silanol group in a molecule by a reaction with moisture produces the compound having one silanol group in a molecule by reacting with moisture during storage, at the time of curing, or after curing. It is presumed that flexibility of a cured product is given by a reaction of the thus-formed compound having one silanol group in a molecule with a crosslinkable silyl group of a vinyl polymer or a siloxane bond formed by crosslinking, to thereby reduce crosslinking points.

The addition level of the silanol-containing compound is preferably 0.1 to 50 parts by weight, more preferably 0.3 to 20 parts by weight and still more preferably 0.5 to 10 parts by weight, per 100 parts of the vinyl polymer. When the level is below 0.1 parts by weight, the effects caused by addition may be hard to appear, and on the contrary, when it exceeds 50 parts by weight, crosslinking may be insufficient and strength or gel fraction ratio tend to be deteriorated.

The time to add the silanol compound into a vinyl polymer is not particularly restricted, but it may be added in the production process of vinyl polymer, or may be added in the preparation process of a curable composition.

<Thixotropy Providing Agent (Antisagging Agent)>

A thixotropy providing agent (antisagging agent) may be added to the curable composition of the present invention according to need for sagging prevention and workability improvement.

The antisagging agent is not particularly restricted but includes, among others, polyamide waxes; hydrogenated castor oil and derivatives thereof; and metal soaps such as calcium stearate, aluminum stearate and barium stearate. These thixotropy-providing agents (antisagging agents) may be used singly or two or more of them may be used in combination of two or more.

<Light-Curable Material>

A light curable material may be added to the curable composition of the present invention, if necessary. The "light-curable material" is a material the chemical structure of which is chemically changed in a short time by light action, to thereby show property changes such as curing. Addition of the light-curable material makes it possible to reduce tackiness on a surface of a cured product derived from a curable composition (such tackiness is also referred to as "residual tack"). The light-curable material is a material capable of curing by irradiation of light. Representative one is a material capable of curing by, for example, still standing at a sunny place in a room (around a window) at room temperature for one day. Many compounds have been known as this kind of compounds, such as organic monomers, oligomers, resins or compositions containing them. Although it is not particularly limited, for example, unsaturated acrylic compounds, poly(vinyl cinnamate)s, or azide-functionalized resins may be mentioned, among others.

The unsaturated acrylic compounds are monomers or oligomers represent by the following general formula (47), or mixtures of these.

$$CH_2=CHR^{62}CO(O)— \quad (47)$$

wherein $R^{62}$ represents hydrogen, an alkyl group containing 1 to 10 carbon atoms, an aryl group containing 6 to 10 carbon atoms, or an aralkyl group containing 7 to 10 carbon atoms.

As the unsaturated acrylic compounds, specific examples which may be mentioned, among others, are (meth)acrylic acid esters of low-molecular alcohols such as ethylene glycol, glycerin, trimethylolpropane, pentaerythritol and neopentyl alcohol; (meth)acrylic acid esters of acids such as bisphenol A or isocyanuric acid or of alcohols derived from the above alcohols by modifying with ethylene oxide or propylene oxide; (meth) acrylic acid esters such as a polyether polyol having a polyether main chain and a terminal hydroxyl group, a polymer polyol obtainable by radical polymerization of a vinyl polymer in a polyol having a polyether main chain, a polyester polyol having a polyester main chain and a terminal hydroxyl group, and a polyol having a vinyl or (meth)acryl polymeric main chain and a hydroxyl group in the main chain; epoxyacrylate oligomers obtainable by reacting an epoxy resin, such as a bisphenol A-type resin or a novolac-type resin, with (meth)acrylic acid; urethaneacrylate oligomers having a urethane bond and a (meth)acrylate group in the molecular chain obtainable by reacting polyol, polyisocyanate, hydroxyl group-containing (meth)acrylate and the like compounds; and the like.

The poly(vinyl cinnamate)s are photosensitive resins having a cinnamoyl group as a photosensitive group, and many poly(vinyl cinnamate) derivatives may be mentioned, including an esterification product of poly(vinyl alcohol) with cinnamic acid.

The azide-functionalized resins are known as photosensitive resins having an azide group as a photosensitive group, and includes rubber photosensitive liquids containing an azide compound as a photosensitizer and, in addition, specific examples mentioned in "Photosensitive Resins" (published on March 17, Showa-47, by Insatsu Gakkai Shuppanbu Ltd., from page 93, from page 106 and from page 117). Generally, these may be used singly or as mixture, and optionally an intensifier may be added.

Among these photosensitive materials, unsaturated acrylic compounds are preferable because they are easy to handle.

The photosensitive material is preferably added in an amount of from 0.01 to 20 parts by weight per 100 parts by weight of a vinyl polymer. When the amount is below 0.01 parts by weight, addition effects may be poor. On the contrary, when it exceeds 20 parts by weight, properties of the product may be adversely affected. In certain cases, addition of an intensifier such as a ketone or a nitro compound, or an amine makes the effects enhanced.

<Curable Material by Air Oxidation>

A curable material by air oxidation may be added to the curable composition of the present invention, if necessary. The "curable material by air oxidation" is a material having an unsaturated group capable of crosslinking and curing by oxygen in the air. Addition of the material curable by air oxidation makes it possible to reduce tackiness on a surface of a cured product derived from a curable composition (such tackiness is also referred to as "residual tack"). The material curable by air oxidation is a material capable of curing by contact with the air, and more specifically a material capable of curing by reaction with oxygen in the air. Representative one is curable by, for example, still standing in the air in a room for one day.

As the materials curable by air oxidation, specific examples which may be mentioned, among others, are drying oils such as tung oil and linseed oil, various kinds of alkyd resins obtainable by modification of said drying oils; acrylic polymers, epoxy resins and silicone resins modified with drying oils; 1,2-polybutadiene, 1,4-polybutadiene, polymers or copolymers of C5 to C8 dienes, and various kinds of modified product of said polymers or copolymers (maleated, boiled oil-modified, etc.). Among them, liquid form tung oil and linseed oil (liquid diene polymers) or the modified products thereof are particularly preferred.

As specific examples of said liquid diene polymers, there may be mentioned liquid polymers obtainable by polymerizing or copolymerizing diene compounds such as butadiene, chloroprene, isoprene or 1,3-pentadiene; polymers, such as NBR or SBR, which are obtainable by copolymerizing said diene compounds with monomers copolymerizable with said diene compounds, such as acrylonitrile or styrene, such that the diene compounds may be a major component; and the like. These may be used singly or in combination or two or more. Liquid polybutadiene is preferred among these liquid diene compounds.

The materials curable by air oxidation may be used singly or in combination of two of more. In certain cases, effects may be enhanced by using a catalyst capable of promoting oxidation-curing reaction or metal dryer together with the material curable by air oxidation. As the catalyst or the metal dryer, there may be mentioned, among others, metal salts such as cobalt naphthenate, lead naphthenate, zirconium naphthenate, cobalt octylate and zirconium octylate; amine compounds; and the like.

The curable material by air oxidation is preferably added in an amount of 0.01 to 20 parts by weight per 100 parts by weight of a vinyl polymer. When the amount is below 0.01 parts by weight, effects caused by addition may be poor. On the contrary, when it exceeds 20 parts by weight, properties of the product may be adversely affected.

<Antioxidant>

An antioxidant may be incorporated into the curable composition of the present invention, if necessary. There are various known antioxidants and for example, there may be mentioned, among others, the various antioxidants described in "Handbook of antioxidants", published by Taiseisha, or "Deterioration and stabilization of polymer material" (235 to 242), published by CMC or the like, but are not limited to these.

For example, there may be mentioned thioether-based antioxidants such as MARK PEP-36 and MARK AO-23 (both are produced by Adeka Argus), phosphorous antioxidants such as Irgafos 38, Irgafos 168, Irgafos P-EPQ (both are produced by Ciba Geigy Japan), and the like. Among them, hindered phenol compounds as mentioned below are preferred.

As the hindered phenol compounds, the followings are particularly mentioned:
2,6-di-tert-butyl-4-methylphenol, 2,6-di-tert-butyl-4-ethylphenol, mono- (or di- or tri-) (α-methylbenzyl)phenol, 2,2'-methylenebis(4-ethyl-6-tert-butylphenol), 2,2'-methylenebis(4-methyl-6-tert-butylphenol), 2,2'-butylidenebis(3-methyl-6-tert-butylphenol), 2,2'-thiobis(3-methyl-6-tert-butylphenol), 2,5-di-tert-butylhydroquinone, 2,5-di-tert-amylhydroquinone, triethylene glycol-bis—3-(3-t-butyl-5-methyl-4-hydroxyphenyl)propionate, 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thiodiethylenebis[3-(3,5-di-t-butyl-4-hydroxyphenyl) propionate, octadecyl-3-(3,5-di-t-butyl-4-hydroxyphenyl) propionate, N,N'-hexamethylenebis(3,5-di-t-butyl-4-hydroxy-hydrocinnamamide), 3,5-di-t-butyl-4-hydroxybenzylphosphonate-diethyl ester, 1,3,5-trimethyl-2,4,6-tris(3,5-di-t-butyl-4-hydroxybenzyl)benzene, bis(ethyl 3,5-di-t-butyl-4-hydroxybenzylphosphonate)calcium, tris-(3,5-di-t-butyl-4-hydroxybenzyl)isocyanurate, 2,4-2,4-bis[(octylthio)methyl] o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl) benzotriazole, 2-[2-hydroxy-3,5-bis(a,a-dimethylbenzyl) phenyl-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)-benzotriazole, a condensate of methyl-3-[3-t-butyl-5-(2H-benzotriazole-2-yl)-4-hydroxyphenyl] propionate-polyethylene glycol (molecular weight: about 300), hydroxyphenylbenzotriazole derivatives, bis(1,2,2,6,6-pentmethyl-4-piperidyl) 2-(3,5-di-t-butyl-4-hydroxybenzyl)-2-n-butylmalonate, 2,4-di-t-butylphenyl-3,5-di-t-butyl-4-hydroxybenzoate, and the like.

When they are described as trade names, there may be mentioned, but are not limited to, NOCRAC 200, NOCRAC M-17, NOCRAC SP, NOCRAC SP-N, NOCRAC NS-5, NOCRAC NS-6, NOCRAC NS-30, NOCRAC 300, NOCRAC NS-7, NOCRAC DAH (all of the above products are produced by Ouchishinko Chemical Industrial), MARK AO-30, MARK AO-40, MARK AO-50, MARK AO-60, MARK AO-616, MARK AO-635, MARK AO-658, MARK AO-80, MARK AO-15, MARK AO-18, MARK 328, MARK AO-37 (all of the above products are produced by Adeka Argus), IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, IRGANOX-1425WL (all of the above products are produced by Ciba Geigy Japan), Sumilizer GM, Sumilizer GA-80 (both are produced by Sumitomo Chemical), and the like.

An antioxidant may be used in combination of a photostabilizer, which is described below. It is particularly preferable to use combinedly since the effects are further expressed and particularly heat resistance may be improved by the combined use in certain cases. It is possible to use Tinuvin C353 or Tinuvin B75 (both are produced by Ciba Geigy Japan), in which an antioxidant and a photostabilizer are mixed in advance.

The level of addition of the antioxidant is preferably in the range between 0.1 and 10 parts by weight, per 100 parts by weight of a vinyl polymer. When the level is below 0.1 parts by weight, improving effect on weatherability may be poor. On the contrary, when it exceeds 5 parts by weight, there is little difference in the effect and it is economically disadvantageous.

<Photostabilizer>

A photostabilizer may be incorporated into the curable composition of the present invention, if necessary. There are various known photostabilizers and for example, there may be mentioned, among others, the various photostabilizers described in "Handbook of antioxidants", published by Taiseisha, or "Deterioration and stabilization of polymer material" (235 to 242), published by CMC or the like, but are not limited to these.

Although it is not particularly limited, ultraviolet absorbents are preferred among photostabilizers. Specifically, there may be mentioned benzotriazol compounds such as Tinuvin P, Tinuvin 234, Tinuvin 320, Tinuvin 326, Tinuvin 327, Tinuvin 329, and Tinuvin 213 (all of the above products are produced by Ciba Geigy Japan), triazine compounds such as Tinuvin 1577, benzophenone compounds such as CHIMASSORB 81, benzoate compounds such as Tinuvin 120 (produced by Ciba Geigy Japan), and the like.

Additionally, hindered amine compounds are also preferable. As such hindered amine compounds, there may be mentioned dimethyl succinate-1-(2-hydroxyethyl)-4-hydroxy-2,2,6,6-tetramethylpiperidine polycondensation product,
poly({6-(1,1,3,3-tetramethylbutyl)amino-1,3,5-triazin-2,4-diyl}{(2,2,6,6-tetramethyl-4-piperidyl)imino},
N,N-bis(3aminopropyl)ethylenediamine-2,4-bis[N-butyl-N-(1,2,2,6,6-pentamethyl-4-piperidyl)amino]-6-chloro-1,3,5-triadine condensation product,
bis(2,2,6,6-tetramethyl-4-peperidyl)sebacate, succinic acid-bis(2,2,6,6-tetramethyl-4-piperidinyl) ester, and the like.

When they are described as trade names, there may be mentioned, but are not limited to, Tinuvin 622 LD, Tinuvin 144, CHIMASSORB 944 LD, CHIMASSORB 119 FL, Irgafos 168 (all of the above products are produced by Ciba Geigy Japan), MARK LA-52, MARK LA-57, MARKLA-62, MARK LA-67, MARK LA-63, MARKLA-68, MARK LA-82, MARK LA-87 (all of the above products are produced by Adeka Argus), SANOL LS-770, SANOL LS-765, SANOL LS-292, SANOL LS-2626, SANOL LS-1114, SANOL LS-744, SANOL LS-440 (all of the above products are produced by Sankyo), and the like.

Although it is not particularly limited, an ultraviolet absorbent and hindered amine compounds may be used combinedly since the combination is sometimes more effective, and use of the combination may be preferred in certain cases.

A photostabilizer may be used together with the above-mentioned antioxidant. It is particularly preferable to use combinedly since the effects are further expressed and particularly heat resistance may be improved by the combined use in certain cases. It is possible to use Tinuvin C353 or Tinuvin B75 (both are produced by Ciba Geigy Japan), in which an antioxidant and a photostabilizer are mixed in advance.

The level of addition of the antioxidant is preferably in the range between 0.1 and 10 parts by weight, per 100 parts by weight of a vinyl polymer. When the level is below 0.1 parts by weight, improving effect on weatherability may be poor. On the contrary, when it exceeds 5 parts by weight, there is little difference in the effect and it is economically disadvantageous.

<Other Additives>

Where necessary, one or more of various additives may be added to the curable composition of the present invention for the purpose of adjusting various physical properties of the curable composition and/or cured products. As examples of such additives, there may be mentioned, among others, flame retardants, curability adjusting agents, antiaging agent, radical inhibitors, ultraviolet absorbers, metal deactivators, antiozonants, phosphorus-containing peroxide decomposers, lubricants, pigments, foaming agents, and photocurable resins. These various additives may be used singly or two or more species may be used in combination.

Specific examples of these additives are described, for example, in Japanese Kokoku Publication Hei-04-69659, Japanese Kokoku Publication Hei-07-108928, Japanese Kokai Publication Sho-63-254149 and Japanese Kokai Publication Sho-64-22904.

The curable composition of the present invention may be prepared as a one-component formulation by compounding all the ingredients in advance and storing the resulting compound in a tightly closed container, which formulation, when applied, undergoes curing by atmospheric moisture, or as a two-component formulation by separately compounding a curing catalyst, filler, plasticizer, water and other ingredients in advance. In the latter case, the compound is admixed with the polymer composition prior to use. In the case of such two-component formulation, a colorant can be added in the step of mixing the two components and thus it becomes possible to prepare a rich assortment of colors with limited stocks in providing liquid gasket for In-Place Forming. Thus, two-component formulations make it easy to cope with the demand for multicolor systems. The colorant, when prepared, for example in the form of a paste by blending a pigment and plasticizer, optionally together with a filler, facilitates the application work. Furthermore, by adding a retarder in blending the two components together, it is possible to exactly adjust the curing rate at the site of application.

<<Liquid Gasket for In-Place Forming>>

The "liquid gasket for In-Place forming" according to the present invention means a liquid gasket (liquid sealant) used in In-Place forming gasket method which comprises sealing parts with automatically coating a liquid sealant on assembling line with an aid of a robot or the like.

The liquid gasket for In-Place forming comprises a moisture-curable vinyl polymer, especially a vinyl polymer having at least one crosslinkable silyl group. As the moisture-curable vinyl polymer, the vinyl polymers described above may be mentioned.

Furthermore, the present liquid gasket for In-Place forming is used for sealing a site requiring oil resistance. The part requiring oil resistance is not particularly restricted, but includes sites in automobile parts, electric parts, various kinds of machine parts and the like. Specifically, there may be mentioned oil-pan joint surfaces (flange surfaces), fuel pump joint surfaces, mission joint surfaces, differential joint surfaces, joint surfaces of a part of oil pressure adjusting apparatus, oil pump joint surfaces, cylinder head cover joint surfaces, engine oil seal retainer joint surfaces, cylinder head joint surfaces, front bearing retainer joint surfaces, drain plug joint surfaces, transmission oil-pan joint surfaces, transmission case cover joint surfaces, extension housing joint surfaces, differential carrier joint surfaces, rear axle housing end joint surfaces, rear axle bearing retainer joint surfaces, differential carrier cover joint surfaces, and the like.

Additionally, the present liquid gasket for In-Place forming can be used for sealing a site requiring oil resistance and heat resistance. The site requiring oil resistance and heat resistance is not particularly restricted, but includes, for example, a site around an automobile engine, especially the above-mentioned oil-pan joint surfaces and the joint surfaces of cylinder head or cylinder head cover in an automobile, and the like.

Furthermore, liquid gasket for In-Place forming according to the present invention is preferably a gasket which yields a cured product exhibiting an oil resistance superior to that of a cured product from a polymer obtained by replacing the repeating unit in the main chain thereof with butyl acrylate alone, in any one item of the immersion test according to JIS K 6258 for the land use 3-5 lubricating oil specified in JIS K 2215;

a gasket which yields a cured product exhibiting an oil resistance represented by mass change between before and after immersion of at most 50% in the immersion test according to JIS K 6258 for the land use 3-5 lubricating oil specified in JIS K 2215;

a gasket which yields a cured product with smaller mass change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215; or a gasket which yields a cured product with smaller volume change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

In this description, the land use 3-5 lubricating oil specified in JIS K 2215 and the immersion test according to JIS K 6258 are the same as described hereinabove.

In addition, preferred range of mass change, volume change and change of mechanical properties between before and after immersion are the same as defined hereinabove.

The In-Place formed gasket according to the present invention is formed from the liquid gasket for In-Place forming according to the present invention. And the In-Place formed gasket may be produced by applying the liquid gasket for In-Place forming on a site requiring oil resistance, and then curing it. As the site requiring oil resistance, the same ones as described above may be mentioned.

<<Cured Products>>

<Uses>

The curing composition of the present invention can be used in various fields of application which include, but are not limited to, sealing materials, for example sealing materials such as elastic sealing materials for building and construction and sealing materials for laminated glass, electric and electronic part materials such as solar cell back sealers, electric insulating materials such as wire/cable insulating sheath, pressure sensitive adhesive materials, adhesives, elastic adhesives, paints, powder paints, coating compositions, foamed bodies, potting materials for electric and electronic use, films, gaskets, casting materials, various molding materials, and rustproof and waterproof sealants for end faces (cut sections) of net glass or laminated glass. Although it is not particularly limited, it is preferable to apply to a liquid sealing agent used in an automobile parts, an electric parts and various kinds of machine parts, in view of its properties.

BEST MODES FOR CARRYING OUT THE INVENTION

In the following, specific examples according to the present invention and comparative examples are given to illustrate the present invention. The following examples are, however, by no means limitative of the scope of the present invention.

In the following examples and comparative examples, "part(s)" and "%" mean "part(s) by weight" and "% by weight", respectively.

In the following examples, the "number average molecular weight" and "molecular weight distribution (ratio of weight average molecular weight to number average molecular weight)" were calculated by the standard polystyrene equivalent method using gel permeation chromatography (GPC). The GPC column used was one packed with crosslinked polystyrene in a gel form (Shodex GPC K-804; product of Showa Denko) and the GPC solvent used was chloroform.

PRODUCTION EXAMPLE 1

A 10-L separable flask equipped with a reflux condenser and a stirrer was charged with CuBr (36.02 g, 0.2511 mol), and the reaction vessel inside was purged with nitrogen. Acetonitrile (618 mL) was added, and the contents were stirred on an oil bath at 70° C. for 15 minutes. Thereto were added butyl acrylate (360 mL, 2.51 mol), ethyl acrylate (500 mL, 4.62 mol), 2-methoxyethyl acrylate (375 mL, 2.91 mol), diethyl 2,5-diboromoadipate (150.68 g, 0.419 mol) and pentamethyldiethylenetriamine (hereinafter referred to as "triamine")(2.18 mL, 1.81 g, 10.46 mmol), and the reaction was thereby started. While heating at 70° C. with stirring, a mixture composed of butyl acrylate (1,440 mL), ethyl acrylate (2,002 mL) and 2-methoxyethyl acrylate (1,498 mL) was added dropwise continuously over 210 minutes. During the dropping of the monomer mixture, triamine (7.63 mL, 6.33 g, 36.5 mmol) was added. After the lapse of 330 minutes after start of the reaction, 1,7-octadiene (1,236 mL, 922 g, 8.37 mol) and triamine (26.16 mL, 21.71 g, 0.125 mol) were added, and the heating at 70° C. with stirring was continued for 250 minutes.

The reaction mixture was diluted with toluene and passed through an activated alumina column, and the volatile matter was then distilled off under reduced pressure to give an alkenyl-terminated copolymer {alkenyl-terminated poly(butyl acrylate, ethyl acrylate, methoxyethyl acrylate); hereinafter referred to as copolymer [1]}.

A 10-L separable flask equipped with a reflux column was charged with the copolymer [1] (2.87 kg), potassium acetate (79.57 g) and N,N-dimethylacetamide (2.9 L), and the mixture was heated at 100° C. with stirring under a nitrogen stream for 8 hours. The N,N-dimethylacetamide was removed by heating under reduced pressure, and the residue was diluted with toluene. The toluene-insoluble matter (KBr and excess potassium acetate) was filtered off using an activated alumina column. The volatile matter was distilled off from the filtrate under reduced pressure to give a copolymer (copolymer [2]).

A 10-L separable flask equipped with a reflux column was charged with the copolymer [2] (2.87 kg), an acidic aluminum silicate (143 g, Kyowaad 700SL, product of Kyowa Chemical), a basic aluminum silicate (287 g, Kyowaad 500SH, product of Kyowa Chemical) and xylene (0.57 L), and the mixture was heated at 130° C. under a nitrogen stream for 5 hours. The aluminum silicates were filtered off, and toluene was distilled off from the filtrate under reduced pressure to give a vinyl group-terminated copolymer (copolymer [3]). The copolymer obtained had a number average molecular weight of 17,000 as determined by GPC measurement (polystyrene equivalent basis) with a molecular weight distribution of 1.16. The average number of vinyl groups introduced per copolymer molecule as determined by $^1$H NMR analysis was about 2.2.

A one-liter pressure reaction vessel was charged with the copolymer [3] (718.80 g), dimethoxymethylhydrosilane (27.55 mL, 0.223 mol), methyl orthoformate (8.14 mL, 0.074 mol) and platinum(0)-1,1,3,3-tetramethyl-1,3-divinyldisiloxane complex. The amount of the platinum catalyst used was such that the mole ratio thereof to the alkenyl group in the polymer amounted to $5 \times 10^{-4}$ equivalents. The reaction mixture was heated at 100° C. for 4 hours with stirring. The volatile matter was then distilled off from the mixture under reduced pressure, whereby a silyl group-terminated copolymer (copolymer [4]) was obtained. The polymer obtained had a number average molecular weight of 20,000 as determined by GPC (on the polystyrene equivalent basis) with a molecular weight distribution of 1.3. The average number of the silyl groups introduced per copolymer molecule as determined by $^1$H NMR spectrometry was 2.1.

PRODUCTION EXAMPLE 2

A silyl group-terminated vinyl polymer (polymer [5]) was obtained in the same manner as in Production Example 1 except that ethyl acrylate and 2-methoxyethyl acrylate were not added among raw materials and thus only butyl acrylate was used as the acrylate monomer. The polymer obtained had a number average molecular weight of 22,000 as determined by GPC (on the polystyrene equivalent basis) with a molecular weight distribution of 1.4. The average number of the silyl groups introduced per copolymer molecule as determined by $^1$H NMR spectrometry was 2.0.

PRODUCTION EXAMPLE 3

The reaction was carried out in the same manner as in Production Example 1 using a 50-L polymerization machine equipped with a reflux condenser and a stirrer by adding, as raw materials, CuBr (188.02 g, 1.3107 mol), acetonitrile (3,226 mL), butyl acrylate (9,396 mL), ethyl acrylate (13,060 mL), 2-methoxyethyl acrylate (9,778 mL), diethyl 2,5-diboromoadipate (786.55 g), pentamethyldiethylenetriamine (187.76 mL,), and 1,7-octadiene (6,452 mL). The reaction mixture was diluted with toluene and passed through an activated alumina column, and the volatile matter was then distilled off under reduced pressure to give an alkenyl-terminated copolymer {alkenyl-terminated poly(butyl acrylate, ethyl acrylate, methoxyethyl acrylate); hereinafter referred to as copolymer [6]}.

A 10-L separable flask equipped with a reflux column was charged with the copolymer [6] (3.0 kg), potassium acetate (24.5 g) and N,N-dimethylacetamide (3 L), and the mixture was heated at 100° C. with stirring under a nitrogen stream for 10 hours. The N,N-dimethylacetamide was removed by heating under reduced pressure, and the residue was diluted with toluene. The toluene-insoluble matter (KBr and excess potassium acetate) was filtered off using an activated alumina column. The volatile matter was distilled off from the filtrate under reduced pressure to give an alkenyl-terminated copolymer {alkenyl-terminated poly(butyl acrylate, ethyl acrylate, methoxyethyl acrylate); hereinafter referred to as copolymer [7]}.

A 10-L separable flask equipped with a reflux column was charged with the copolymer [7] (3 kg), hydrotalcite (450 g, Kyowaad 500SH, Kyowaad 700SL, product of Kyowa Chemical) and xylene (0.6 L), and the mixture was heated at 130° C. under a nitrogen stream for 5.0 hours. The aluminum silicates were filtered off, and the filtrate was evaporated under reduced pressure to give copolymer [8].

A 2-L reaction vessel was charged with the copolymer [8] (1,000 g), trimethoxysilane (34.4 mL), methyl orthoformate (11.7 mL) and platinum(0)-1,1,3,3-tetramethyl-1,3-divinyldisiloxane complex. The total amount of trimethoxysilane was 69 mL, and the total amount of the platinum catalyst used was $5 \times 10^{-4}$ equivalents as the mole ratio relative to the alkenyl group in the copolymer. The mixture was subjected to reaction with heating, and the volatile matter was then distilled off from the mixture under reduced pressure, whereby a silyl group-terminated copolymer (copolymer [9]) was obtained. The copolymer obtained had a number average molecular weight of 21,500 as determined by GPC (on the polystyrene equivalent basis) with a molecular weight distribution of 1.3. The average number of the silyl groups introduced per copolymer molecule as determined by $^1$H NMR spectrometry was 2.3.

Similarly, a 2-L reaction vessel was charged with the copolymer [8], 3-mercaptopropyltrimethoxysilane and 2,2'-azobis-2-methylbutyronitrile. The mixture was subjected to reaction with heating, and the volatile matter was then distilled off from the mixture under reduced pressure sufficiently such that unreacted 3-mercaptopropyltrimethoxysilane would not be remained, whereby a silyl group-terminated copolymer (copolymer [10]) was obtained. The copolymer obtained had a number average molecular weight of 21,500 as determined by GPC (on the polystyrene equivalent basis) with a molecular weight distribution of 1.3. The average number of the silyl groups introduced per copolymer molecule as determined by $^1$H NMR spectrometry was 2.5.

Similarly, a 2-L reaction vessel was charged with the copolymer [8] (1,000 g), dimethoxymethylhydrosilane (29.8 mL), methyl orthoformate (11.7 mL) and platinum(0)-1,1,3,3-tetramethyl-1,3-divinyldisiloxane complex. As is the case with copolymer [9], platinum catalyst and dimethoxysilane were further added in the middle of the reaction. After the mixture was sufficiently reacted with heating, the volatile matter was distilled off from the mixture under reduced pressure, whereby a silyl group-terminated copolymer (copolymer [11]) was obtained. The copolymer obtained had a number average molecular weight of 21,500 as determined by GPC (on the polystyrene equivalent basis) with a molecular weight distribution of 1.3. The average number of the silyl groups introduced per copolymer molecule as determined by $^1$H NMR spectrometry was 2.3.

EXAMPLE 1

One part of a tetravalent tin catalyst (dibutyltin diacetylacetonate) was added into 100 parts of the polymer [4] obtained in Production Example 1 to give a curable composition.

The curable composition was cured at 23° C., 55% R.H. for 2 days and then at 50° C. for 3 days, to give a cured product in the form of a sheet having a thickness of about 2 mm.

EXAMPLE 2

The polymer [4] obtained in Production Example 1 (100 parts) was mixed up with 150 parts of calcium carbonate (Hakuenka CCR: product of Shiraishi Kogyo) and 50 parts of DOP (dioctylphthalate: product of Kyowa Hakko). The mixture was thoroughly mixed with 3-roll paint roll, and one part of a tetravalent tin catalyst (dibutyltin diacetylacetonate) was added into thus-obtained composition, to give a curable composition.

EXAMPLE 3

The polymer [4] obtained in Production Example 1 (100 parts) was thoroughly dehydrated, and each 2 parts of N-(β-aminoethyl)-γ-aminopropyltrimethoxysilane, as an adhesiveness-providing agent, and vinyltrimethoxysilane, as a dehydrating agent, were added into the polymer, to give a composition. Two parts of a tetravalent tin catalyst (dibutyltin diacetylacetonate) was then added into the composition, to give a one-component curable composition.

EXAMPLE 4

One part of a tetravalent tin catalyst (dibutyltin diacetylacetonate) was added into 100 parts of the polymer [9] obtained in Production Example 3, to give a curable composition.

EXAMPLE 5

One part of a tetravalent tin catalyst (dibutyltin diacetylacetonate) was added into 100 parts of the polymer [10] obtained in Production Example 3, to give a curable composition.

EXAMPLE 6

One part of a tetravalent tin catalyst (dibutyltin diacetylacetonate) was added into 100 parts of the polymer [11] obtained in Production Example 3, to give a curable composition.

EXAMPLE 7

The polymer [9] obtained in Production Example 3 (100 parts) was thoroughly dehydrated, and 2 parts of vinyltrimethoxysilane, as a dehydrating agent, was added into the polymer, to give a composition. Two parts of a tetravalent tin catalyst (dibutyltin diacetylacetonate) was then added into the composition, to give a one-component curable composition.

EXAMPLE 8

The polymer [10] obtained in Production Example 3 (100 parts) was thoroughly dehydrated, and 2 parts of vinyltrimethoxysilane, as a dehydrating agent, was added into the polymer, to give a composition. Two parts of a tetravalent tin catalyst (dibutyltin diacetylacetonate) was then added into the composition, to give a one-component curable composition.

EXAMPLE 9

The polymer [11] obtained in Production Example 3 (100 parts) was thoroughly dehydrated, and 2 parts of vinyltrimethoxysilane, as a dehydrating agent, were added into the polymer, to give a composition. Two parts of a tetravalent tin catalyst (dibutyltin diacetylacetonate) was then added into the composition, to give a one-component curable composition.

EXAMPLE 10

The polymer [9] obtained in Production Example 1 (100 parts) was mixed up with 150 parts of calcium carbonate (Hakuenka CCR: product of Shiraishi Kogyo) and 50 parts of UP-1020 (acrylic plasticizer: product of Toagosei). The mixture was thoroughly mixed with 3-roll paint roll, and 1 part of a tetravalent tin catalyst (dibutyltin diacetylacetonate) was then added into thus-obtained composition (base composition), to give a curable composition.

EXAMPLE 11

The polymer [10] obtained in Production Example 1 (100 parts) was mixed up with 150 parts of calcium carbonate (Hakuenka CCR: product of Shiraishi Kogyo) and 50 parts of UP-1020 (acrylic plasticizer: product of Toagosei). The mixture was thoroughly mixed with 3-roll paint roll, and 1 part of a tetravalent tin catalyst (dibutyltin diacetylacetonate) was into thus-obtained composition (base composition) added, to give a curable composition.

EXAMPLE 12

The polymer [11] obtained in Production Example 1 (100 parts) was mixed up with 150 parts of calcium carbonate (Hakuenka CCR: product of Shiraishi Kogyo) and 50 parts of UP-1020 (acrylic plasticizer: product of Toagosei). The mixture was thoroughly mixed with 3-roll paint roll, and 1 part of a tetravalent tin catalyst (dibutyltin diacetylacetonate) was added into thus-obtained composition (base composition), to give a curable-composition.

EXAMPLE 13

The polymer [11] obtained in Production Example 1 (100 parts) was mixed up with 50 parts of carbon black (#60UG: product of Asahi Carbon) and 60 parts of UP-1020 (acrylic plasticizer: product of Toagosei). The mixture was thoroughly mixed with 3-roll paint roll, and 1 part of a tetravalent tin catalyst (dibutyltin diacetylacetonate) was added into thus-obtained composition (base composition), to give a curable composition.

EXAMPLE 14

The polymer [11] obtained in Production Example 1 (100 parts) was mixed up with 20 parts of Aerosil (R974: product of Nippon Aerosil) and 20 parts of UP-1020 (acrylic plasticizer: product of Toagosei). The mixture was thoroughly mixed with 3-roll paint roll, and 1 part of a tetravalent tin catalyst (dibutyltin diacetylacetonate) was added into thus-obtained composition (base composition), to give a curable composition.

EXAMPLE 15

A curable composition was obtained in the same manner as Example 10 except that 2 parts of N-($\beta$-aminoethyl)-$\gamma$-aminopropyltrimethoxysilane as an adhesiveness-providing agent was further added into the composition (base composition) of Example 10 before addition of the tetravalent tin catalyst.

EXAMPLE 16

A curable composition was obtained in the same manner as Example 11 except that 2 parts of N-($\beta$-aminoethyl)-$\gamma$-aminopropyltrimethoxysilane as an adhesiveness-providing agent was further added into the composition (base composition) of Example 11 before addition of the tetravalent tin catalyst.

EXAMPLE 17

A curable composition was obtained in the same manner as Example 12 except that 2 parts of N-($\beta$-aminoethyl)-$\gamma$-aminopropyltrimethoxysilane as an adhesiveness-providing agent was further added into the composition (base composition) of Example 12 before addition of the tetravalent tin catalyst.

EXAMPLE 18

A curable composition was obtained in the same manner as Example 13 except that 2 parts of N-($\beta$-aminoethyl)-$\gamma$-aminopropyltrimethoxysilane as an adhesiveness-providing agent was further added into the composition (base composition) of Example 13 before addition of the tetravalent tin catalyst.

EXAMPLE 19

A curable composition was obtained in the same manner as Example 14 except that 2 parts of N-($\beta$-aminoethyl)-$\gamma$-aminopropyltrimethoxysilane as an adhesiveness-providing agent was further added into the composition (base composition) of Example 14 before addition of the tetravalent tin catalyst.

EXAMPLE 20

The composition before addition of the dehydrating agent according to Example 9 was thoroughly dehydrated, and each 2 parts of N-($\beta$-aminoethyl)-$\gamma$-aminopropyltrimethoxysilane, as an adhesiveness-providing agent, and vinyltrimethoxysilane, as a dehydrating agent, was added into the polymer, to give a composition. Two parts of a tetravalent tin catalyst (dibutyltin diacetylacetonate) was then added into the composition, to give a one-component curable composition.

EXAMPLE 21

The composition before addition of the tetravalent tin catalyst according to Example 12 was thoroughly dehydrated, and each 2 parts of N-($\beta$-aminoethyl)-$\gamma$-aminopropyltrimethoxysilane, as an adhesiveness-providing agent, and vinyltrimethoxysilane, as a dehydrating agent, was added into the polymer, to give a composition. Two parts of a tetravalent tin catalyst (dibutyltin diacetylacetonate) was then added into the composition, to give a one-component curable composition.

COMPARATIVE EXAMPLE 1

A curable composition was obtained in the same manner as Example 1 except that the polymer [5] obtained in Production Example 2 was used in lieu of the polymer [4] used in Example 1.

COMPARATIVE EXAMPLE 2

A curable composition was obtained in the same manner as Example 1 except that the polymer [5] obtained in Production Example 2 was used in lieu of the polymer [4] used in Example 1, and 100 parts of calcium carbonate was added in lieu of 150 parts thereof.

COMPARATIVE EXAMPLE 3

A common silicone liquid gasket, Seal Packing Black (product of Tacti) was used as a component of mixture.

COMPARATIVE EXAMPLE 4

Seal Packing 1281 (product of Tacti), which is a silicone liquid gasket for apparatus for supplying oily material, was used as a component of mixture.

COMPARATIVE EXAMPLE 5

A common modified silicone liquid gasket 1218D (product of Three Bond), which is used as an engine oil-resistant gasket, was used as a component of mixture.

COMPARATIVE EXAMPLE 6

A common silicone liquid gasket 1215 (product of Three Bond), which is used as an engine oil-resistant gasket, was used as a component of mixture.

(Evaluation 1) . . . Surface Curability

Sheets were formed using the curable compositions (blended mixtures) obtained in the Example 1 and 2, 7 to 9, 20 and 21 and Comparative Example 1 to 4. These sheets were left at 23° C.×55% R.H. Skin formation time (namely, time for skinny film formation caused by curing of the surface of curable composition in the form of sheet) was then measured by using the time until which said curable composition could not adhere to metal spatula when the spatula was placed on the sheet of the curable composition and then brought up. The surface curability was evaluated by the skin formation time, and the results are shown in Table 1.

TABLE 1

| | Skin formation time (hrs) |
|---|---|
| Example 1 | 0.5 |
| Example 2 | 0.5 |
| Example 7 | 0.3 |
| Example 8 | 0.4 |
| Example 9 | 3.0 |
| Example 20 | 1.0 |
| Example 21 | 0.8 |
| Compar. Example 1 | 0.5 |
| Compar. Example 2 | 0.5 |

TABLE 1-continued

| | Skin formation time (hrs) |
|---|---|
| Compar. Example 3 | 0.3 |
| Compar. Example 4 | 0.5 |

(Evaluation 2) . . . Depth Curability

The curable compositions obtained by Example 3, Example 12 and Comparative Example 3 and 4 were packed respectively into cylindrical polytube with a diameter of 18 mm, and then left at 23° C., 55% R.H. for 1 week. Cured depth of the curable composition from the surface exposed to the air was measured and thus depth curability was evaluated. The results are shown in Table 2.

TABLE 2

| | Depth Curability (mm) |
|---|---|
| Example 3 | 7 |
| Example 12 | 11 |
| Compar. Example 3 | 8 |
| Compar. Example 4 | 5 |

(Evaluation 3) . . . Oil Resistance

The curable compositions obtained in the Example 1, Comparative Example 1, 3 and 4 were cured at 23° C., 55% R.H. for 2 days and then at 50° C. for 3 days, to give a cured product in the form of a sheet having a thickness of about 2 mm. The cured products were subjected to evaluation of mass change based on the immersion test according to JIS K 6258. As a land use 3-5 lubricating oil specified in JIS K 2215, commercially available engine oil (trade name: GEOMA, SJ grade, 5W-30: product of JOMO) was used. The results are shown in Table 3.

The silicone liquid gasket for apparatus for supplying oily material (comparative Example 4) showed as good oil resistance as the vinyl polymer composition of the present invention (Example 1). However, it has been generally said that exudation appears even when good oil resistance (mass/volume change) is shown. As is the above case, oil exudation (sweating) was observed on the cured product after oil resistance test when the composition of Comparative Example 4 is used in the present experiment. There was no oil exudation in the case of using the vinyl polymer composition of the present invention (Example 1), which could be expected from its chemical structure.

TABLE 3

| | Mass Change (%) |
|---|---|
| Example 1 | 5 |
| Compar. Example 1 | 56 |
| Compar. Example 3 | 30 |
| Compar. Example 4 | 7 |

Immersion condition: 150° C. × 70 hrs (Evaluation 4) . . . Mechanical Properties The curable compositions obtained in the Example 2 and Comparative Example 2 to 4 were cured at 23° C., 55% R.H. for 2 days and then at 50° C. for 3 days, to give a cured product in the form of a sheet having a thickness of about 2 mm. No. 2 (1/3) dumbbell test specimens (JIS K 7113) were punched out from the sheet-form cured product and measured for tensile properties (using a Shimadzu autograph, measurement environment: 23° C., rate of pulling: 200 mm/min). The results are shown in Table 4. In Table 4, M50 represents stress at 50% elongation, M100 represents stress at 100% elongation, Tmax represents maximum strength, and Eb represents elongation at break.

TABLE 4

|  | M50 (MPa) | M100 (MPa) | Tmax (MPa) | Eb (%) |
| --- | --- | --- | --- | --- |
| Example 2 | 0.22 | 0.37 | 0.88 | 280 |
| Compar. Example 2 | 0.13 | 0.25 | 0.47 | 220 |
| Compar. Example 3 | 0.50 | 0.79 | 1.91 | 310 |
| Compar. Example 4 | 1.61 | 2.37 | 2.59 | 120 |

(Evaluation 5) . . . Heat Resistance

The curable compositions obtained in the Example 1 to 21 and Comparative Example 5 were cured at 23° C., 55% R.H. for 1 week, and then at 50° C. for 1 week to give a cured product in the form of a sheet having a thickness of about 2 mm. The sheet-form cured product was left at rest at 150° C. for 24 hours. Touching the surface of the cured product with hand, heat resistance thereof was evaluated by judging the surface state.

TABLE 5

|  | State of cured product |
| --- | --- |
| Example 1 | No change |
| Example 2 | No change |
| Example 3 | No change |
| Example 4 | No change |
| Example 5 | No change |
| Example 6 | No change |
| Example 7 | No change |
| Example 8 | No change |
| Example 9 | No change |
| Example 10 | No change |
| Example 11 | No change |
| Example 12 | No change |
| Example 13 | No change |
| Example 14 | No change |
| Example 15 | No change |
| Example 16 | No change |
| Example 17 | No change |
| Example 18 | No change |
| Example 19 | No change |
| Example 20 | No change |
| Example 21 | No change |
| Compar. Example 5 | Rubber elasticity has been lost, and the cured product was crumbled to the touch |

(Evaluation 6) . . . Adhesiveness

The curable compositions obtained in the Example 15 to 21 and Comparative Example 6 were applied in the form of bead on adherends of an aluminum plate (JIS A 1100P) and a steel plate (cold-rolled steel plate), and lightly pressed with a metal spatula. They were cured at 23° C., 55% R.H. for 1 week, and then adhesiveness thereof was evaluated. The adhesiveness was judged by a visual observation of state during peeling when the cured product was peeled off in the direction of 0° or 1800. The results are shown in Table 6.

TABLE 6

| State of Failure | Aluminum Plate | | Steel Plate | |
| --- | --- | --- | --- | --- |
|  | 180° | 0° | 180° | 0° |
| Example 15 | CF | CF | CF | CF |
| Example 16 | CF | CF | CF | CF |
| Example 17 | CF | CF | CF | CF |
| Example 18 | CF | CF | CF | CF |
| Example 19 | CF | CF | CF | CF |
| Example 20 | CF | CF | CF | CF |
| Example 21 | CF | CF | CF | CF |
| Compar. Example 6 | AF | AF | AF | AF |

CF: Cohesion failure
AF: Adhesive failure (Evaluation 7) . . . Paintablility and Pressure-Resistant Test The curable composition obtained in the Example 21 was packed into a paper cartridge (modified silicone type, product of Showa Marutsutsu). The composition was coated by extruding it from the cartridge, on pressure vessel equipped with pressure test flange specified in JIS K 6820, and then demonstrated a pressure-resistance test at room temperature. It was resistant to the pressure not less than 10 MPa, which was exceeding the standard specified as type-2 (7.85 MPa).

INDUSTRIAL APPLICABILITY

The present invention relates to a vinyl polymer which has at least one crosslinkable silyl group and can yield a cured product exhibiting an oil resistance superior to that of a cured product from a polymer obtained by replacing the repeating unit thereof with butyl acrylate alone, in any one item of the immersion test according to JIS K 6258 for the land use 3-5 lubricating oil specified in JIS K 2215, as well as a curable composition containing the vinyl polymer and a liquid gasket for In-Place forming. The curable composition containing a vinyl polymer and a liquid gasket for In-Place forming according to the present invention has especially improved oil resistance, and is also excellent in heat resistance and adhesiveness, among liquid sealing agent used for an automobile part, an electric part or various kinds of machine parts.

The invention claimed is:

1. A vinyl polymer which has at least one crosslinkable silyl group and yields a cured product exhibiting an oil resistance superior to that of a cured product from a polymer obtained by replacing the repeating unit in the main chain thereof with butyl acrylate alone, in any one item of the immersion test according to JIS K 6258 for the land use 3-5 lubricating oil specified in JIS K 2215, wherein the main chain of the vinyl polymer is a (meth)acrylic polymer produced by polymerizing mainly ethyl acrylate monomer in a living radical polymerization.

2. A vinyl polymer which has at least one crosslinkable silyl group and yields a cured product exhibiting an oil resistance represented by mass change between before and after immersion of at most 50% in the immersion test according to JIS K 6258 for the land use 3-5 lubricating oil specified in JIS K 2215.

3. The vinyl polymer according to claim 1, which yields a cured product with smaller mass change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

4. The vinyl polymer according to claim 1, which yields a cured product with smaller volume change between before and after immersion than that of a cured product from a polymer obtained by replacing the repeating unit in the main chain thereof with butyl acrylate alone, in the immersion test according to JIS K 6258 for the land use 3-5 lubricating oil specified in JIS K 2215.

5. The vinyl polymer according to claim 1, a molecular terminus of the main chain of which is a crosslinkable silyl group.

6. The vinyl polymer according to claim 1, which has a molecular weight distribution of less than 1.8.

7. The vinyl polymer according to claim 1, wherein the living radical polymerization is an atom transfer radical polymerization.

8. The vinyl polymer according to claim 7, wherein a catalyst used for the atom transfer radical polymerization is a transition metal complex containing a central metal selected from the group consisting of an element belonging to the group 7, 8, 9, 10 or 11 of the periodic table.

9. The vinyl polymer according to claim 8, wherein the metal complex used for the catalyst is a complex selected from the group consisting of copper, nickel, ruthenium or iron complex.

10. The vinyl polymer according to claim 9, wherein the metal complex is a copper complex.

11. A curable composition which comprises 100 parts by weight of the vinyl polymer according to claim 1 and 0.1 to 20 parts by weight of a curing catalyst.

12. The curable composition according to claim 11, which comprises a curing catalyst containing tin.

13. A curable composition which comprises 100 parts by weight of the vinyl polymer according to claim 1 and 0.1 to 20 parts by weight of an adhesiveness-providing agent.

14. The curable composition according to claim 13, wherein the adhesiveness-providing agent is a silane coupling agent.

15. A curable composition which comprises
   100 parts by weight of the vinyl polymer according to claim 1, and
   5 to 150 parts by weight of a plasticizer.

16. The curable composition according to claim 15, wherein the plasticizer is a phthalic acid plasticizer.

17. The curable composition according to claim 15, wherein the plasticizer is a polymer plasticizer.

18. A curable composition which comprises
   100 parts by weight of the vinyl polymer according to claim 1, and
   5 to 1000 parts of a filler.

19. The curable composition according to claim 18, which comprises at least one member selected from the group consisting of silica, calcium carbonate and carbon black.

20. The vinyl polymer according to claim 1,
   wherein the vinyl polymer is a copolymer of ethyl acrylate, butyl acrylate and 2-methoxyethyl acrylate.

21. The vinyl polymer according to claim 20,
   wherein the vinyl polymer is a copolymer of ethyl acrylate/butyl acrylate/2-methoxyethyl acrylate at a weight ratio of 40 to 50/20 to 30/30 to 20.

* * * * *